(12) United States Patent
Kimura et al.

(10) Patent No.: US 10,031,601 B2
(45) Date of Patent: Jul. 24, 2018

(54) BLACK ELECTRODE, METHOD OF MANUFACTURING BLACK ELECTRODE SUBSTRATE AND DISPLAY DEVICE

(71) Applicant: TOPPAN PRINTING CO., LTD., Taito-ku (JP)

(72) Inventors: Yukihiro Kimura, Taito-ku (JP); Kenzo Fukuyoshi, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 25 days.

(21) Appl. No.: 15/396,930

(22) Filed: Jan. 3, 2017

(65) Prior Publication Data
US 2017/0115786 A1 Apr. 27, 2017

Related U.S. Application Data

(63) Continuation of application No. PCT/JP2014/068446, filed on Jul. 10, 2014.

(51) Int. Cl.
*G06F 3/045* (2006.01)
*G06F 3/041* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
CPC ....... G06F 3/044; G06F 3/0412; G06F 3/0416
See application file for complete search history.

(56) References Cited

U.S. PATENT DOCUMENTS

| 2009/0096765 A1* | 4/2009 | Kuo | ..................... G02F 1/13338 345/174 |
| 2012/0206395 A1 | 8/2012 | Masaki | |
| 2013/0147730 A1* | 6/2013 | Chien | ................... G06F 3/0412 345/173 |
| 2013/0215067 A1 | 8/2013 | Hwang et al. | |

FOREIGN PATENT DOCUMENTS

| JP | 2011-065393 A | 3/2011 |
| JP | 2013-540331 A | 10/2013 |

(Continued)

OTHER PUBLICATIONS

International Search Report dated Sep. 16, 2014 in PCT/JP2014/068446, filed Jul. 10, 2014.

(Continued)

*Primary Examiner* — Nan-Ying Yang
(74) *Attorney, Agent, or Firm* — Oblon, McClelland, Maier & Neustadt, L.L.P.

(57) ABSTRACT

A black electrode substrate includes a transparent substrate having a first surface and a second surface opposite to the first surface, the second surface having a display region in a rectangular shape in plan view and an outer region outside of the display region, a black wiring forming a black electrode pattern that defines a plurality of pixel opening portions in the display region, and a transparent resin layer formed in the display region such that the transparent resin layer has the same rectangular shape as the display region in plan view. The black wiring has a laminated structure including a first black layer, a first indium-containing layer, a copper-containing layer, a second indium-containing layer, and a second black layer. The black wiring has a terminal portion formed such that the second indium-containing layer positioned in the outer region is exposed from the laminated structure.

20 Claims, 15 Drawing Sheets

(51) Int. Cl.
*G06F 3/044* (2006.01)
*G02F 1/1333* (2006.01)
*G02F 1/1362* (2006.01)
*G02F 1/1343* (2006.01)
*G02F 1/1368* (2006.01)

(52) U.S. Cl.
CPC .... *G02F 1/13439* (2013.01); *G02F 1/134363* (2013.01); *G02F 1/136286* (2013.01); *G06F 3/044* (2013.01); *G06F 3/0416* (2013.01); *G02F 2001/13629* (2013.01); *G02F 2001/134372* (2013.01); *G02F 2001/136295* (2013.01); *G02F 2201/121* (2013.01); *G02F 2203/01* (2013.01); *G06F 2203/04103* (2013.01)

(56) References Cited

FOREIGN PATENT DOCUMENTS

| TW | 200919279 A | 5/2009 |
| TW | 201418880 A | 5/2014 |
| WO | WO 2011/052392 A1 | 5/2011 |

OTHER PUBLICATIONS

Combined Taiwanese Office Action and Search Report dated Jun. 27, 2017 in Patent Application No. 103126325 (with partial English translation and English translation of categories of cited documents).

\* cited by examiner

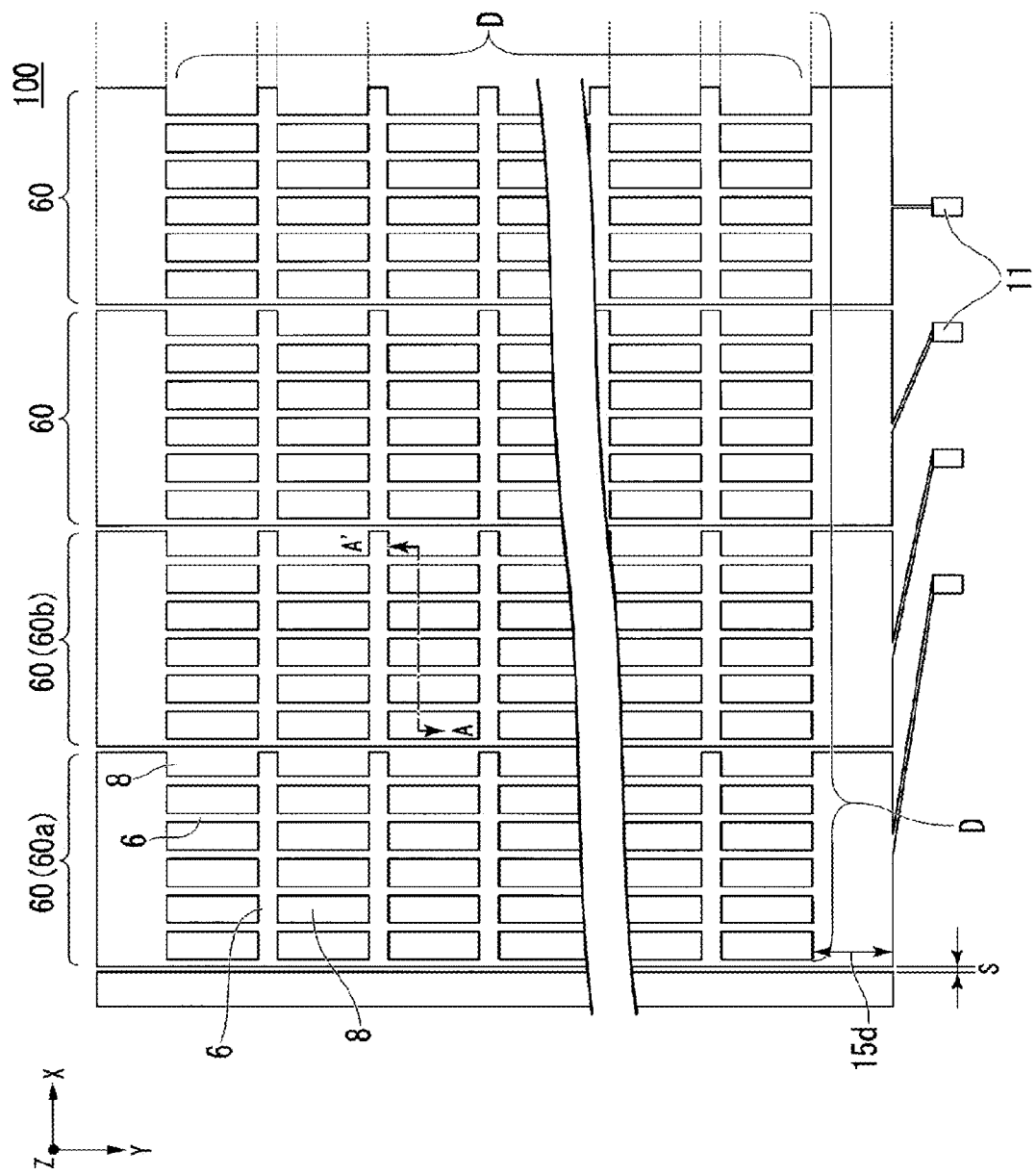

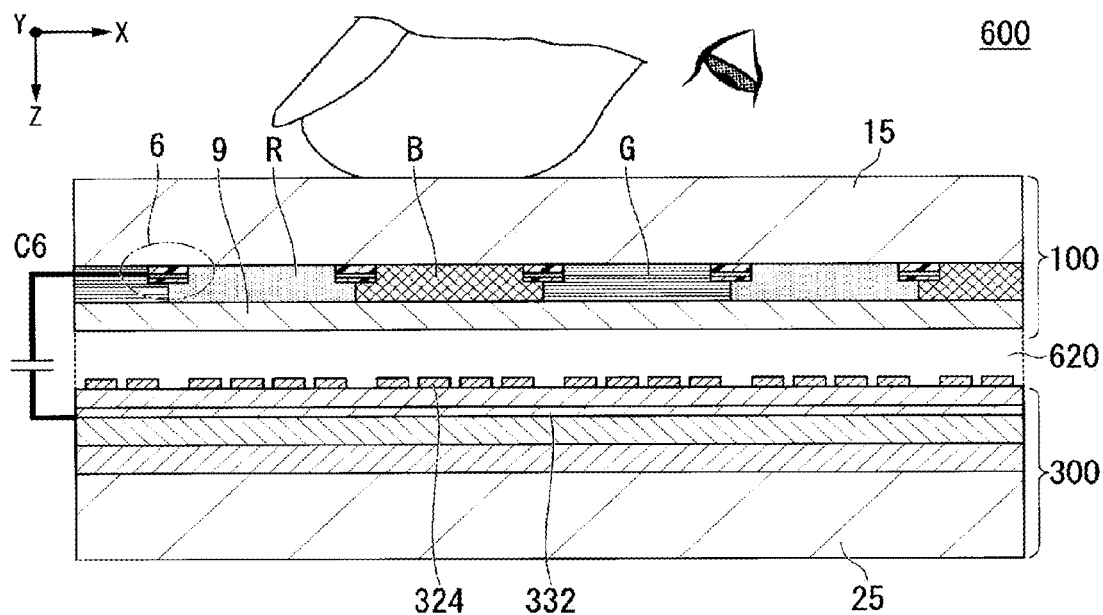
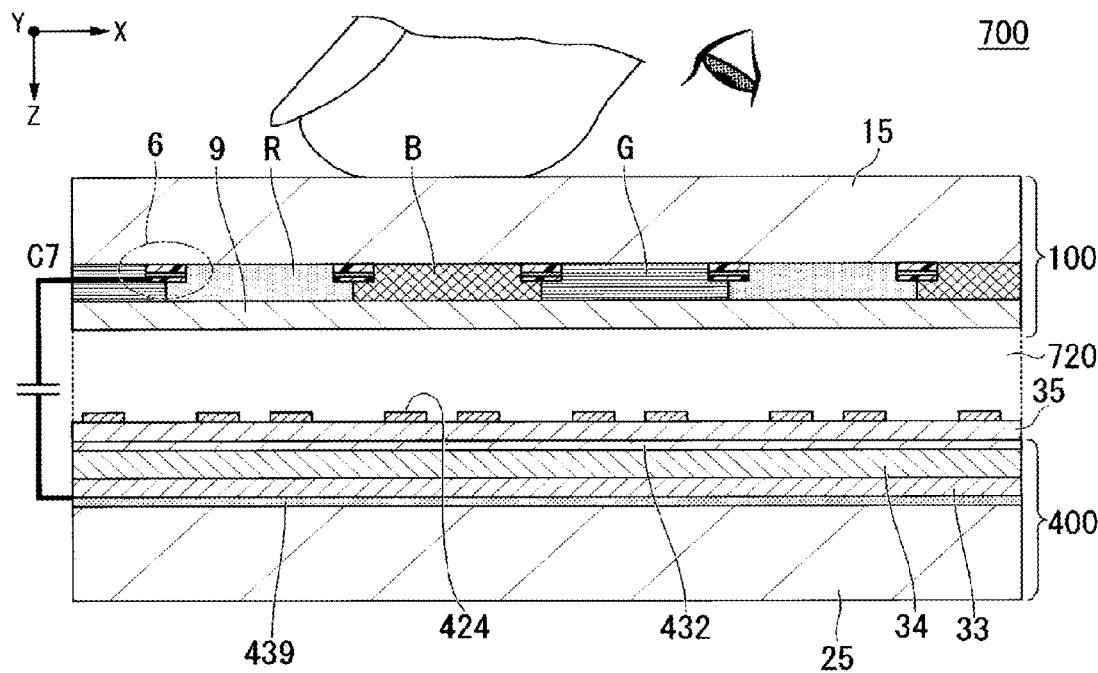

BLACK ELECTRODE, METHOD OF MANUFACTURING BLACK ELECTRODE SUBSTRATE AND DISPLAY DEVICE

CROSS-REFERENCE TO RELATED APPLICATIONS

The present application is a continuation of and based upon and claims the benefits of priority to International Application No. PCT/JP2014/068446, filed Jul. 10, 2014. The entire contents of this application are incorporated herein by reference.

BACKGROUND OF THE INVENTION

Field of the Invention

The present invention relates to a black electrode substrate provided with a metal wiring having low resistance and improving visibility thereof, a method of manufacturing a black electrode substrate and a display apparatus provided with the black electrode substrate.

The black electrode substrate is used for an in-cell type display device integrating capacitive type touch sensing functionality into the liquid crystal cell.

Discussion of the Background

Generally, display devices configured to use a touch panel are well known. The touch panel is disposed on a display surface of a display device which is provided in portable equipment such as smartphones or tablet computers. The touch panel is used as an input device which detects a contact between a finger or a pointer or the like and the touch panel. The major detection method for detecting a position of the finger or the pointer on the touch panel is a capacitive detection method which detects capacitive-change on the touch panel caused by a contact between the finger or the pointer and the touch panel.

The structure of providing the touch panel in the display device may increase the entire thickness or weight of the display device. Accordingly, the touch panel is considered as an unnecessary component in this structure of the display device. In this respect, a touch panel mainly using an organic film has been known, which reduces weight of the display device. However, even with this type of touch panel, it is difficult to avoid an increase of the entire thickness of the display device. Further, in the case where the display device is provided with the above-mentioned touch panel and high definition pixels, there is a disadvantage that necessary input (pen input) onto the touch panel is difficult to achieve.

Specifically, when the display device has high definition pixels of 400 ppi (pixel per inch), or 500 ppi or more, the pixel pitch is around 10 μm to 20 μm. Thus, if the display device has the above-mentioned touch panel and such high definition pixels, most of touch panels do not tolerate the pen pressure of the pen. Moreover, such display devices raise problems, including a problem of limited resolution in the opening configuring the input portion of the touch panel, or a problem of difficulty in achieving sufficient resolution of the touch panel to obtain high definition of the display device. Therefore, touch sensing technique for the touch panel is required to be sophisticated.

In recent years, development of so-called 'in-cell' touch-sensing technique (hereinafter referred to as in-cell display device) without using a touch panel has been developed, in which the touch sensing function is provided in the liquid crystal cell or in the display device.

For the above-described display device, generally, a configuration provided with a color filter substrate and an array substrate is known. The color filter substrate is composed of a plurality of regularly-arranged colored layers, and the array substrate includes active elements such as TFT (Thin Film Transistor) disposed therein.

For the in-cell display device, an in-cell structure provided with a pair of touch sensing electrode group has been developed. The pair of touch sensing electrode group is provided in either the color filter substrate or the array substrate, or provided in both of the color filter substrate and the array substrate. According to this structure, by detecting a change in electrostatic capacitance produced between touch sensing electrode groups, a touch sensing functionality can be achieved to detect an input-position of a finger or a pointer or the like.

In the case where an organic film is used as a base material of a touch panel, expansion and contraction of the base material (e.g., thermal expansion coefficient) is large. Hence, it is difficult to align positions (i.e., alignment) between a red pixel pattern, a green pixel pattern and a blue pixel pattern and a black matrix pattern, which compose fine pixels each having a size of approximately 10 μm to 20 μm. Therefore, the organic film base material is difficult to use for high-definition color filter substrates. As a conventional type display device, for example, display devices disclosed in PTLs 1 to 3 are known.

PTL 1: JP-A-2011-065393
PTL 2: JP-A-2013-540331
PTL 3: WO 2011-052392

SUMMARY OF THE INVENTION

According to one aspect of the present invention, a black electrode substrate includes a transparent substrate having a first surface which is a touch-sensing input surface and a second surface opposite to the first surface, the second surface having a display region in a rectangular shape in plan view and an outer region outside of the display region, a black wiring forming a black electrode pattern that defines pixel opening portions in the display region, and a transparent resin layer formed in the display region such that the transparent resin layer overlaps with the black electrode pattern and has the same rectangular shape as the display region in plan view. The black wiring has a laminated structure including a first black layer including carbon and positioned in the display region and the outer region, a first indium-containing layer positioned on the first black layer, a copper-containing layer positioned on the first indium-containing layer, a second indium-containing layer positioned on the copper-containing layer, and a second black layer positioned on the second indium-containing layer. The black wiring has a terminal portion formed such that the second indium-containing layer positioned in the outer region is exposed from the laminated structure.

According to another aspect of the present invention, a method of manufacturing a black electrode substrate includes preparing a transparent having a first surface which is a touch-sensing input surface and a second surface opposite to the first surface such that the second surface has a display region in a rectangular shape in plan view and an outer region outside of the display region, forming a black wiring having a black electrode pattern, forming a transparent resin layer in the display region such that the transparent resin layer has the same rectangular shape as the display region in plan view, and that the outer region is exposed, and forming a terminal portion of the black wiring on the outer region. The forming of the black wiring includes forming a first black film including carbon on the transparent substrate, forming a first indium-containing film on the first black film, forming a copper-containing film on the first indium-containing film, forming a second indium-containing film on the copper-containing film, forming a second black film including carbon on the second indium-containing film, forming a second black layer by patterning the second black film, and etching, with the second black layer as a mask, the first black film, the first indium-containing film, the copper-containing film, and the second indium-containing film such that the black electrode pattern is formed. The forming of the terminal portion includes removing a portion of the transparent resin layer in a thickness direction and the second black layer located in the outer region.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is an enlarged plan view showing a black electrode pattern disposed on the black electrode substrate according to the first embodiment of the present t invention

FIG. 11 is a partial cross-sectional view showing a display device according to a fourth embodiment of the present invention.

FIG. 12 is a partial cross-sectional view showing a display device according to a fifth embodiment of the present invention.

DESCRIPTION OF THE EMBODIMENTS

Figure 1:
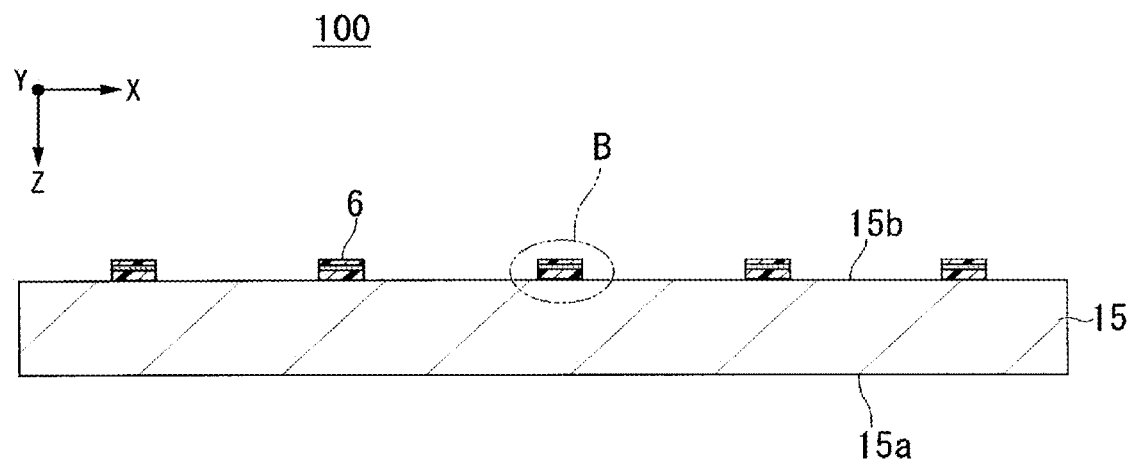
FIG. 1 is a cross-sectional view taken along A-A' line of FIG. 3, showing a part of a black electrode substrate according to a first embodiment of the present invention.

The embodiments will now be described with reference to the accompanying drawings, wherein like reference numerals designate corresponding or identical elements throughout the various drawings.

Hereinafter, with reference to the drawings, several embodiments of the present invention will be described as follows.

In the following description, the same reference signs are designated to elements having the same or substantially the same functions, and the description will be omitted or will be described as needed.

In each of the drawings, dimension and ratio of respective elements are appropriately made different from that of actual objects, in order to allow the respective elements to be recognized on the drawings.

In each of the embodiments, only characteristics portion will be described, and description will be omitted for portions in the display device according to the present invention which are not different from the elements in an ordinary display device. The embodiments will each be described by way of an example of a black electrode substrate or a liquid crystal display device provided with the black electrode substrate. The black electrode substrate according to embodiments of the present invention can be applied to a display device such as organic EL display device, instead of the liquid crystal display device.

First Embodiment

Hereinafter, with reference to FIGS. 1 to 3, a black electrode substrate 100 according to an embodiment of the present invention will be described.

FIG. 1 illustrates a minimum configuration of a black electrode substrate according to the present embodiment. The black electrode substrate 100 is provided with a transparent substrate 15, and a plurality of black wirings 6 provided on the transparent substrate 15. The cross-sectional view of FIG. 1 illustrates that the plurality of black wirings 6 are disposed on the transparent substrate 15. As shown in plan view of FIG. 3, the black wiring 6 configures a black electrode pattern 60 having a plurality of pixel opening portions 8. In other words, regions formed between the plurality of black wirings 6 shown in FIG. 1 correspond to the pixel opening portion 8. A display portion, a shape of the opening, the number of pixels of the display device, which will be described later in detail, are not limited to the above-mentioned configurations.

As shown in FIG. 1, the transparent substrate 15 includes a first surface 15a serving as a touch-sensing input surface, and a second surface 15b located on an opposite side of the first surface 15a. As shown in FIG. 2B, the transparent substrate 15 includes a display region 15c (reference sign D shown in FIG. 3) defined on the second surface 15b, having a rectangular shape in plan view, and an outer region 15d defined on the second surface 15b and located at outer side of the display region 15c. In other words, the outer region 15d has a frame shape surrounding the display region 15c. The display region 15c is a region for a display portion which configures the display device. The outer region 15d is a region for a frame portion which configures the display device. As a material for the transparent substrate 15, a glass substrate represented by non-alkali glass is used. As a material for the transparent substrate 15, a resin film having high elasticity is not used. The thickness of the transparent substrate 14 ranges, for example, from 0.1 mm to 1 mm.

Figure 2A:
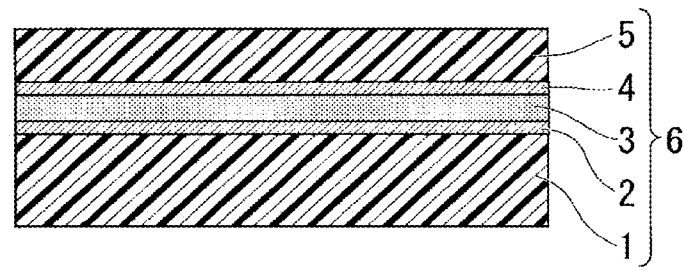
FIG. 2A is an enlarged cross-sectional view showing a black wiring disposed on the black electrode substrate according to the first embodiment of the present invention, i.e. an enlarged diagram showing a major portion indicated by a symbol B shown in FIG. 1.
Figure 2B:
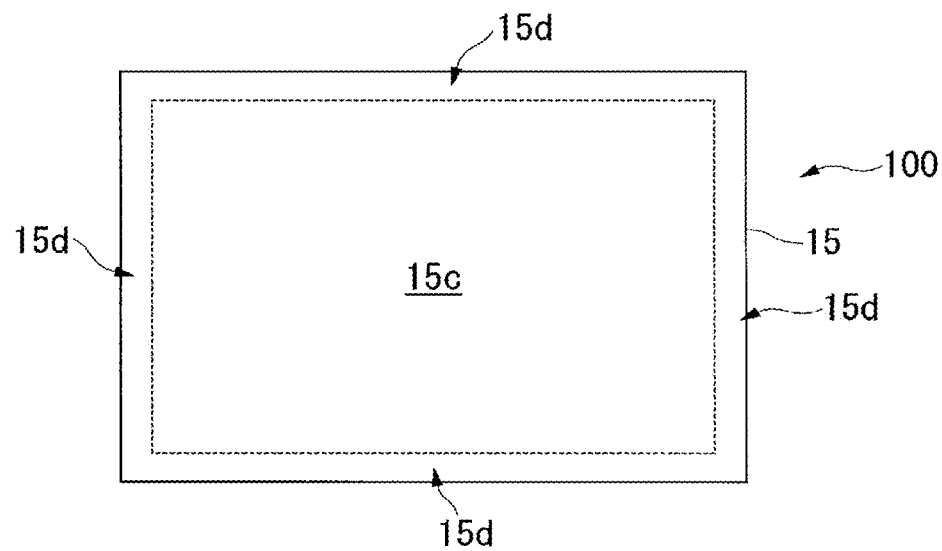
FIG. 2B is a plan view as viewed from a first surface, showing the entire transparent substrate forming the black electrode substrate according to the first embodiment of the present invention.

As shown in FIG. 2A, the black wiring 6 is composed of a first black layer 1, a first indium-containing layer 2, a copper-containing layer 3 formed of a copper layer or a copper-alloy layer, a second indium-containing layer 4, and a second black layer 5, which are formed on the transparent substrate 15 in this order.

The first black layer 1 is disposed on the second surface 15b and located in the display region 15c and the outer region 15d. The first indium-containing layer 2 is disposed on the first black layer 1. The copper-containing layer 3 is disposed on the first indium-containing layer 2. The second indium-containing layer 4 is disposed on the copper-containing layer 3. The second black layer 5 is disposed on the second indium-containing layer 4. In other words, the black wiring 6 has a laminated structure composed of the first black layer 1, the first indium-containing layer 2, the copper-containing layer 3, the second indium-containing layer 4, and the second black layer 5.

FIG. 3 is a partial plan view showing the black electrode substrate 100 according to the embodiment of the present invention. The cross section taken along the line A-A' of FIG. 3 is shown in FIG. 1.

As shown in FIG. 3, the black electrode substrate 100 according to the present embodiment includes the black electrode pattern 60 formed on the second surface 15b, defined by the black wiring 6 extending in a X-direction (first direction) and a Y-direction (second direction perpendicular to the first direction). A plurality of black electrode patterns 60 are formed on the second surface 15b. Each of the black electrode patterns 60 has a plurality of pixel opening portions 8 (opening pattern) in a rectangular shape extending in the Y-direction, formed on the display region 15c and surrounded by the black wiring 6. In other words, in the black electrode pattern 60, the black wirings 6 extend in the X-direction and the Y-direction, and the black wiring 6 extending in the X-direction and the black wiring 6 extending in the Y-direction are connected at connecting portions so as to form a matrix pattern (lattice pattern). In this configuration, the black wirings 6 each extending in the X-direction and the Y-direction are electrically connected to each other, to form a connection structure having a lattice pattern, thereby improving the strength. As shown in FIG. 3, 6 pixel openings are arranged in the X-direction and 480 pixel openings are arranged in the Y-direction in a single electrode pattern 60.

It should be noted that two mutually adjacent black electrode patterns 60 (e.g., first black electrode pattern 60a and second electrode pattern 60b) are electrically isolated by a slit S. The pixel opening portions 8 are also provided between two electrically isolated black electrode patterns 60. Even in this case, according to an embodiment of the present invention, the pixel opening portions 8 are defined by the black wiring 6. Further, each black electrode pattern 60 has a terminal portion 11 provided in the outer region 15d. A lead wire is provided between a conductive portion of the black electrode pattern 60 formed on the display region 15c and the terminal portion 11 disposed in the outer region 15d. In the terminal portion 11, the second indium-containing layer 4 is exposed by removing the second black layer 5 which forms a laminated structure of the black wiring 6.

The black electrode patterns 60 having the above-mentioned patterns are arranged along the X-direction to be in parallel to each other. The number of black electrode patterns 60 is, for example, 320 pcs. Therefore, the total number of pixels in the black electrode substrate 100 shown in FIG. 3 is 1920×480. In the example shown in FIG. 3, the first black layer 1 and the second black layer 5 are formed to have the same pattern shape and the same line width. However, the line widths of the first black layer 1 and the second black layer 5 may be different, and the pattern shape may be different between the first black layer 1 and the second black layer 5.

According to the present embodiment, each of the black electrode patterns 60 is defined by the black wiring 6 such that 6 pixel openings 8 are arranged in the X-direction, and one black electrode pattern 60 forms one black touch sensing electrode. However, the present invention is not limited to this configuration. A plurality of black wirings 6 may be formed on the transparent substrate 15 to be arranged in parallel to the X-direction, and a wiring group (e.g., grouping with which 6 wirings form a wiring group) may define the plurality of black wirings 6. In this case, one wiring group may form one black touch sensing electrode.

Also, in the case where the black touch sensing electrode is formed by the wiring group, it is not necessary to use all of the black wirings that configure the wiring groups as drive electrodes (i.e., electrodes that generate a touch signal). For example, in a structure of a plurality of black wirings arranged in the X-direction, 6 black wirings are defined as one group and a plurality of black wiring groups is formed on the transparent substrate 15. Further, black wiring arranged on every sixth wiring may be used as a drive electrode. Specifically, a drive method can be used in which 5 black wirings are thinned out (removed) from 6 black wirings, and a scan signal may be sent to the one black wiring, thereby driving (scanning) the black wiring. In this case, removed (thinned-out) 5 black wirings are in a state of electrically floating.

(Black Layer)

The first black layer 1 and the second black layer 5 contain carbon as a major color material (i.e., black color material). The first black layer 1 and the second black layer 5 are made of resin in which the black color material is dispersed. In the following description, the first black layer 1 and the second black layer 5 are sometimes simply referred to as a black layer. Only the provision of copper oxide or copper-alloy oxide on the transparent substrate 15 cannot achieve sufficient black or low reflectance properties. However, by providing the black layer on the transparent substrate 15, the reflectance of visible light on a surface of the black wiring 6 can be reduced to 3% or less. Further, as will be described later, since the first black layer and the second black layer 5 are provided to sandwich the copper-containing layer 3, high light-shielding properties can be obtained.

As a black color material, carbon, carbon nanotubes, or a mixture of a plurality of organic pigments and carbon can be used. For example, 51 mass % or more carbon is used as a major color material, and blue or red organic pigments can be added to the above-mentioned color material so as to adjust the reflected color. For example, by adjusting a carbon density (lower carbon density) contained in a photo-sensitive black coating liquid used as a starting material, reproducibility of color expressed in the black layer can be improved. According to the present embodiment, the carbon density is in a range from 4 to 50 mass % relative to the entire solid content including resin or curing agent and pigments. The carbon density may exceed 50 mass %. However, when the carbon density exceeds 50 mass % relative to the entire solid content, the suitability of the coating film is likely to be lowered. When the carbon density is 4 mass % or less, sufficient black color cannot be obtained so that reflection may occur due to a metal layer (copper-containing layer 3) disposed under the black layer, thereby significantly lowering the visibility. In the following embodiments, when the carbon density is not mentioned, the carbon density is 40 mass % relative to the entire solid contents. Since the carbon density is thus determined, even when a large exposure apparatus is used, black wiring having thin line, for example, 1 μm to 5 μm line width can be formed by patterning.

When the black layer is formed, an alignment mark is formed on the transparent substrate 15 using the same material of the black layer. The alignment mark is used for an exposure step or aligning the patterns during photolithography process as a post-process. In the case where a process using the alignment mark is prioritized, an optical density of the black layer can be set, for example, to 2 or less in a transmittance measurement. The second black layer 5 may be formed by using a mixture of a plurality of pigments as a black color material without using carbon. For the reflectance of the first black layer 1 and the second black layer 5, taking the refractive index (approximately 1.5) of the base material of a glass or a transparent resin into consideration, it is preferable to adjust content or type of the black color material, and content, type or film thickness of the resin to be used. When the condition for forming the black layer is optimized, the reflectance at the boundary surface between the base material, such as glass, of which the refractive index is approximately 1.5 and the black layer can be set to 2% or less within a wavelength range of visible light. The refractive index of the black layer is preferably 3% or less considering the visibility for the observer. It should be noted that refractive indexes of an acrylic resin used for a color filter, and liquid crystal material are approximately within a range from 1.5 to 1.7.

The total thickness of the black wiring 6 composed of the first black layer 1, the first indium-containing layer 2, a copper-containing layer 3 containing copper or copper-alloy, a second indium-containing layer 4, and a second black layer 5 can be 1 μm or less. In the case where the thickness of the black wiring 6 exceeds 2 μm or more, uneven shape caused by a formation of the black wiring 6 may cause adverse effect to the liquid crystal alignment. Accordingly, the thickness of the black wiring 6 is preferably set to 1.5 μm or less.

In the display region 15c, a plurality of pixel opening portions 8 are formed being surrounded by black wirings 6 (black layer) formed. The pixel opening portion 8 may be formed in a stripe shape, or may be formed in polygonal shape having at least two parallel sides. As a polygonal shape having two parallel sides, rectangle, hexagon, V-shape (doglegged shape) can be mentioned. The pattern shape of the black wiring can be electrically closed shape, as a frame shape surrounding the above-mentioned polygonal pixel. This pattern shape may be electrically closed in plan view or partially opened (partially disconnected in appearance). Depending on these shapes of patterns, electrical noise produced around the liquid crystal display device changes during the detection. In other words, depending on shape or area of the pattern in the copper-containing layer 3 as a metal layer, electrical noise produced around the liquid crystal display device changes during the detection.

(Copper-Containing Layer)

The metal forming the copper-containing layer 3 is copper or copper alloy. In the case where the copper-containing layer 3 is formed using a thin copper film or a thin copper-alloy film, and if the thickness of the copper-containing layer 3 is set to 100 nm or more, or 150 nm or more, visible light hardly transmits through the copper-containing layer 3. Accordingly, sufficient light-shielding properties can be obtained when the thickness of the copper-containing layer 3 is around from 100 nm to 300 nm for example, the copper-containing layer 3 forming the black wiring 6 of the present embodiment.

An alkali tolerant metal layer can be applied to the copper-containing layer 3. Alkali tolerance is required for a development process using alkali development (post-process), for example. Specifically, in a process for forming a color filter, or a process for forming the second black layer 5 into a different pattern (black matrix) from the first black layer 1, alkali tolerance is required for the copper-containing layer 3. Alkali tolerance is required of the copper-containing layer 3 when the terminal portion is formed on the black wiring, which will be described later. Chrome has alkali tolerance and can be used as a metal layer which composes the black wiring 6. However, since the resistance of chrome is high, toxic chrome ion is produced in the manufacturing process for forming a chrome layer. In this respect, considering actual production, it is difficult to apply chrome layer to the black wiring 6. From a point view of low resistance, copper-containing layer 3 is preferably formed using copper or copper alloy. The copper or copper alloy is favorably used for a material of the copper-containing layer 3 because of good conductivity.

The copper-containing layer 3 may contain alloy element at 3 at % or less as a copper alloy. As an alloy element, one or more element can be selected from the group consisting of magnesium, calcium, titanium, molybdenum, indium, tin, zinc, aluminum, beryllium, nickel, scandium, yttrium and gallium. These alloy metals are added to the copper-containing layer 3, whereby the pattern shape can be improved in a pattern formation during the photolithography process. Alloying copper (copper alloy) reduces diffusion of copper from the copper-containing layer 3 to a layer provided around the copper-containing layer 3, so that heat resistance or the like can be improved. In the case where alloy element is added to the copper-containing layer 3 exceeding 3 at %, the resistance of the black wiring becomes high. By adding the alloy metals to the copper-containing layer 3, the pattern shape can be improved in a pattern formation during the photolithography process. It is not preferable for the copper-containing layer 3 forming the black wiring 6 to have high resistance, because the drive voltage waveform in touch sensing may be distorted or a signal delay may occur.

(Indium-Containing Layer)

The first indium-containing layer 2 and the second indium-containing layer 4 have two functions. The first function is to improve adhesive property/bonding property between the black layer and the copper-containing layer. The second function is to improve electrical connectivity between an electrode or a terminal and the copper-containing layer. The adhesion strength of copper, copper alloy, or metal oxide/nitride containing copper are generally low, relative to the black layer which is a dispersion of a resin and a black color material. Further, a peeling may occur at a boundary surface between the black layer and the oxide, or at a boundary surface between the black layer and the nitride. Moreover, generally, electrical connectivity is unstable for the copper, copper alloy, or the metal oxide/nitride containing copper, thereby lacking reliability. For example, the properties of copper oxide or copper sulfide which is formed with time on a copper surface are close to the properties of insulator. Thickness of these indium-containing layers may range from 2 nm to 50 nm, for example.

The first indium-containing layer 2 and the second indium-containing layer 4 (hereinafter will be simply referred to as indium-containing layer) are selected from conductive metal oxide containing indium, or copper indium alloy containing metal indium at 0.5 at % to 40 at % relative to the copper (alloy layer containing copper and indium). By increasing the content of indium-containing in the copper indium alloy, copper oxide which is likely to be formed on the surface of indium-containing layer can be minimized. Further, the indium-containing layer easily accomplishes electrical contact between a terminal or an electrode electrically connected to the copper-containing layer, and the copper-containing layer. When the copper indium alloy is used, metal indium may be contained at 40 at % or more in the indium alloy. Since the indium is costly, it is not preferable to have a high content of indium in the indium-containing layer because of economical reason. In the case where the content of the metal indium is 40 at % or less, since the indium-containing layer has heat resistance property up to 500° C., the indium-containing layer can be used as a metal wiring disposed in an array substrate. Since the atomic weight of indium is larger than that of copper, and the indium is likely to couple with oxygen compared to copper, the indium oxide rather than copper oxide is likely to be formed on the surface of the copper indium alloy. Use of the copper indium alloy can solve the problems including diffusion of copper when copper is singly used, and a formation of voids in the metal layer.

Usable conductive metal oxides containing indium include a mixed oxide so-called ITO (Indium Tin Oxide) containing indium oxide and tin oxide, a mixed oxide containing indium oxide, gallium oxide and zinc oxide, a mixed oxide containing tin oxide and antimony oxide, and a mixed oxide containing indium oxide, tin oxide and zinc oxide. The present invention is not limited to the above-described metal oxides, but the indium-containing layer may contain a mixed oxide containing small amount of other metal oxide added thereto, other metal oxide including titanium oxide, zirconium oxide, hafnium oxide, tungsten oxide and cerium oxide. In the case where the indium-containing layer contains a mixed oxide, 'containing indium' means that the content of indium oxide in the mixed oxide is from 51 wt % to 99 wt %, taking an electrical contact between the surface of the mixed oxide and the copper-containing layer 3 into consideration.

Even when indium is used as a metal, or indium is used as an oxide, adhesion strength of the indium-containing layer can be significantly improved with respect to a resin such as acrylic resin which is a base material of a color filer, a transparent substrate such as of glass, or an inorganic film made of silicon oxide, silicon nitride or the like. Therefore, an indium-containing layer can be provide at a boundary surface between a metal layer (i.e., copper-containing layer) formed of copper or copper alloy and a black layer, or at a boundary surface between the transparent substrate or an inorganic insulation layer and the metal layer. Even when indium is used as a metal, or indium is used as an oxide, by providing the indium-containing layer at the terminal portion, a terminal portion having good electrical connectivity can be provided.

The indium-containing layer can be formed by a method such as sputtering. When the indium-containing layer is formed, oxygen gas other than argon gas is introduced into a film-formation chamber during the sputtering to form the indium-containing layer.

(Function of Black Wiring)

As described above, the black electrode 6 (black electrode pattern 60) is an electrically conductive wiring having a laminated structure in which the copper-containing layer 3 containing copper or copper alloy is sandwiched by two black layers, and the indium-containing layer is provided at a boundary surface between the copper-containing layer 3 and the black layer. The black wiring 6 which will be described in the following embodiment, can serve as a touch sensing electrode used for capacitive type touch sensing.

The touch sensing electrode has a configuration in which a plurality of detection electrodes are disposed in a first direction (e.g., X-direction) in plan view, and a plurality of drive electrodes are disposed in a second direction (Y-direction) via an insulation layer located in a lamination direction (Z-direction). For the drive electrodes, for example, an alternating current (AC) pulse signal having frequency of several KHz to several tens of KHz is applied to the drive electrodes. Normally, the AC pulse signal is thus applied so as to maintain a constant output waveform appearing at the detection electrode. When a finger or a pointer or the like contacts or approaches the first surface 15a which is the touch-sensing input surface, the output waveform of a detection electrode located at a contact portion or a proximity portion changes, whereby it is determined whether there is a touch input.

The black electrode pattern 60 (black wiring 6) can be used as the above-described drive electrode or the detection electrode. According to a configuration in which a transparent conductive wiring 7 (described later) is provided in a direction (Y-direction) perpendicular to a direction (X-direction) where the black electrode pattern 60 is arranged, via an insulation layer of a transparent resin layer or the like, the transparent conductive wiring can be similarly used as a drive electrode or a detection electrode.

The line widths of the first black layer 1 and the second black layer 5 can be the same, but may be different from each other. The first black layer 1 pattern and the second black layer 5 pattern can be the same. It is preferable to design at least either a line width of the first black layer 1 or a line width of the second black layer 5 to be the same as the line width of the copper-containing layer 3. For example, a plurality of black wirings can be arranged in one direction so as to form a stripe pattern, each of the black wirings being composed of the first black layer 1, the first indium-containing layer 2, the copper-containing layer 3 configured of a copper layer or a copper alloy layer, the second indium-containing layer 4 and the second black layer 5. As described above, the transparent conductive wiring can be provided to orthogonally cross the arrangement composed of the plurality of black wirings.

In the case where the line widths between the first black layer 1 and the second black layer 5 which compose the black wiring 6 are the same, or pattern shapes of the first black layer 1 and the second black layer 5 are the same, the second black layer 5 is used as a patterning mask (i.e., resist pattern) to collectively perform wet etching for the indium-containing layer and the copper layer, thereby obtaining the first black layer 1 having a line width which is the same as the second black layer 5. Thus, in the case where the line widths of the first black layer 1 and the second black layer 5 forming the black wiring 6 are the same, or the pattern shapes of the first black layer 1 and the second black layer 5 are the same, the black electrode substrate 100 can be manufactured with a simple manufacturing process. From the viewpoint of opening ratio of the pixel opening 8, respective line widths in the black layer, the indium-containing layer and the copper-containing layer 3 preferably are the same. Herein, the same line width refers to that respective line widths of the black layer, the indium-containing layer and the copper-containing layer 3 are produced, in the known photolithography process including a exposure step, a development step and an etching step, with a width of ±1.5 μm with respect to the target line width.

The black wiring 6 has a configuration having low reflection properties to the visible light, in which the indium-containing layer and the copper-containing layer are sandwiched by the black layers. Hence, the black wiring 6 does not disturb the visibility to the observer. Also, when the black electrode substrate 100 is provided in a liquid crystal display device, light emitted from the backlight of the display device is not reflected by the copper-containing layer 3, and hence light is prevented from being incident on the active element of TFT or the like.

The display device provided with a black electrode substrate according to the first embodiment uses LED light emission elements that emits red light, green light and blue light or the like, as a light source, thereby performing a color display with a field sequential method.

Second Embodiment

Figure 4:
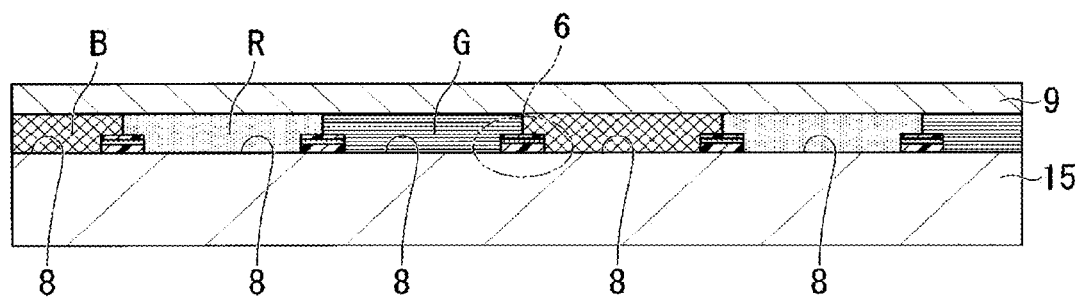
FIG. 4 is a cross-sectional view showing a part of a black electrode substrate according to a second embodiment of the present invention, i.e. showing a structure of a pixel opening portion provided with a red layer, a green layer and a blue layer.

FIG. 4 is a cross-sectional view showing a part of black electrode substrate according to the second embodiment, and showing a structure in which a red layer, a green layer and a blue layer are provided on the pixel opening portions.

In the pixel opening portion 8, a color filter can be laminated to partially overlap an end portion of the second black layer 5. The color filter is composed of colored layers such as a red layer R, a green layer G, and a blue layer B. Further, a transparent resin layer 9 is formed to cover the red layer R, the green layer G, and the blue layer B. To the color filter, other than colored layers of the red layer R, the green layer G and the blue layer B, other color layers can be added, including a light color layer, a complementary color layer, a white layer (transparent layer). Prior to laminating the color filter corresponding to the pixel opening portion 8, the transparent resin layer may be formed on the second surface 15b of the transparent substrate 15, on which the black wiring 6 has been formed, so as to cover the black wiring 6. FIG. 4 exemplifies a configuration in which the transparent resin layer 9 is laminated on the colored layer of the red layer R, the green layer G, and the blue layer B. A thin film of electrically conductive layer (not shown) such as of ITO may be formed on the transparent resin layer 9. In the following embodiments, a configuration in which the transparent conductive wiring is laminated on the color filter will be described.

The colored layer such as the red layer R, the green layer G, and the blue layer B are formed, for example, by dispersing an organic pigment into the photosensitive transparent resin, and forming the transparent resin, where the organic pigment is dispersed, on the color filter, followed by processing using a known photolithography method.

Third Embodiment (Vertical Electric Field Type Liquid Crystal Display Device)

Next, with reference to FIGS. 5 to 10, a liquid crystal display device according to a third embodiment of the present invention will be described. In the third embodiment, the same reference signs are designated to the same elements as the first and second embodiments, and the description is omitted or simplified.

Figure 5:
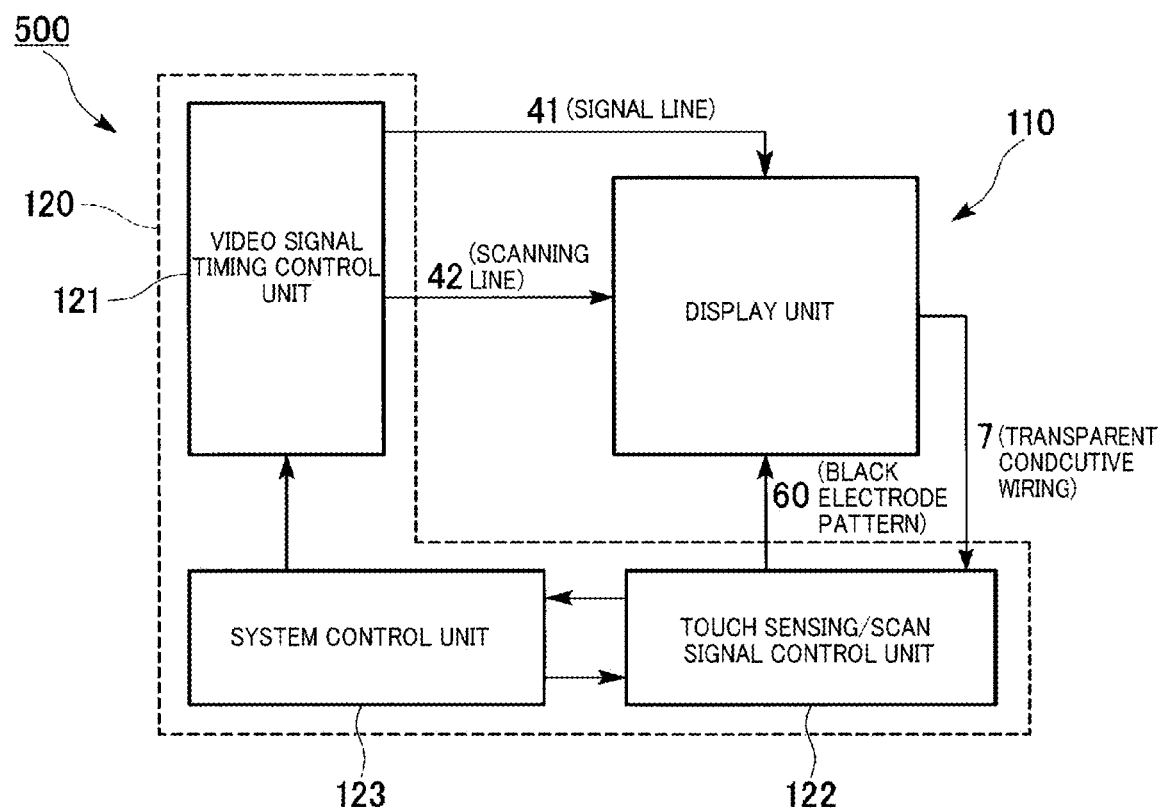
FIG. 5 is a block diagram showing a liquid crystal display device according to a third embodiment of the present invention.

FIG. 5 is a block diagram for explaining functions of the liquid crystal display device according to the present embodiment. A liquid crystal display device 500 according to the present embodiment is provided with a display unit 110, a control unit 120 for controlling the display unit 110 and a touch sensing function. The control unit 120 having a publicly known configurations is provided with a video signal timing control unit 121, a touch sensing/scan signal control unit 122 and a system control unit 123.

The video signal timing control unit 121 controls a plurality of transparent conductive wirings 7 (described later) to be constant voltage, and transmits a signal to a signal line 41 (described later) of the array substrate 200 and a scanning line 42 (described later). A liquid crystal display voltage for display is applied to a pixel electrode 24 (described later) between the transparent conductive layer 7 and the pixel electrode 24 (described later), in a lamination direction Z, thereby performing a liquid crystal driving which drives liquid crystal molecules in a liquid crystal layer 20 (described later). Thus, images are displayed on the array substrate 200.

The touch sensing/scan signal control unit 122 controls the transparent conductive wirings 7, applies a detection drive voltage to the black electrode pattern 60 (black wiring 6), and detects a change in an electrostatic capacitance between the black electrode pattern 60 and the transparent conductive wiring 7 (fringe capacitance), so as to perform touch sensing. The system control unit 123 controls the video signal timing control unit 121 and the touch sensing/scan signal control unit 122.

Figure 6:
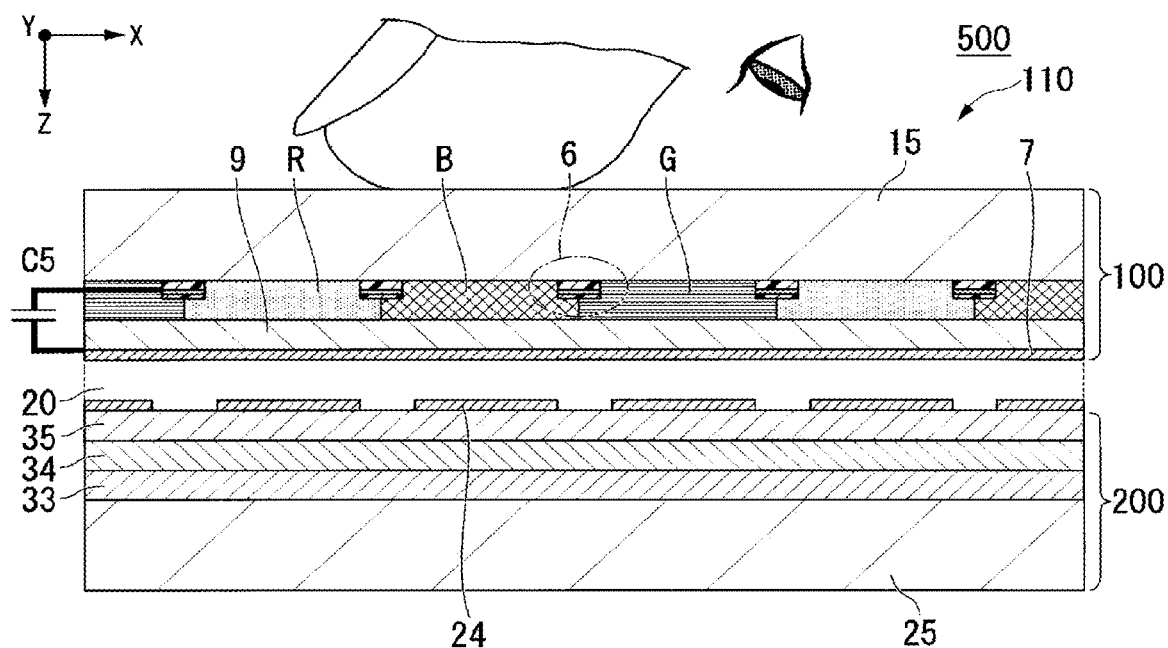
FIG. 6 is a cross-sectional view showing a part of a liquid crystal display device according to the third embodiment of the present invention.
Figure 8:
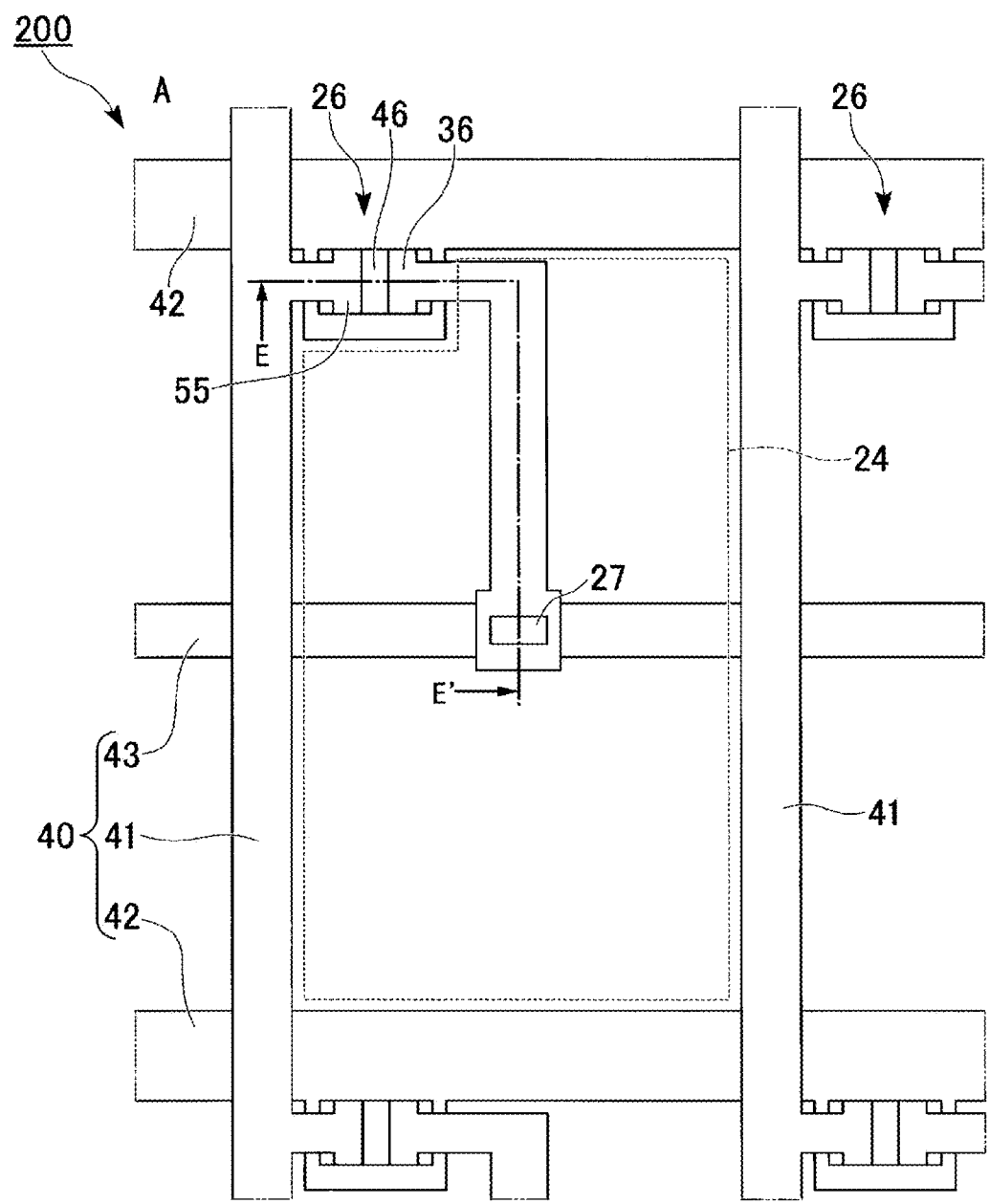
FIG. 8 is a plan view showing an enlarged pixel composing an array substrate of the liquid crystal display device according to the third embodiment of the present invention.
Figure 9A:
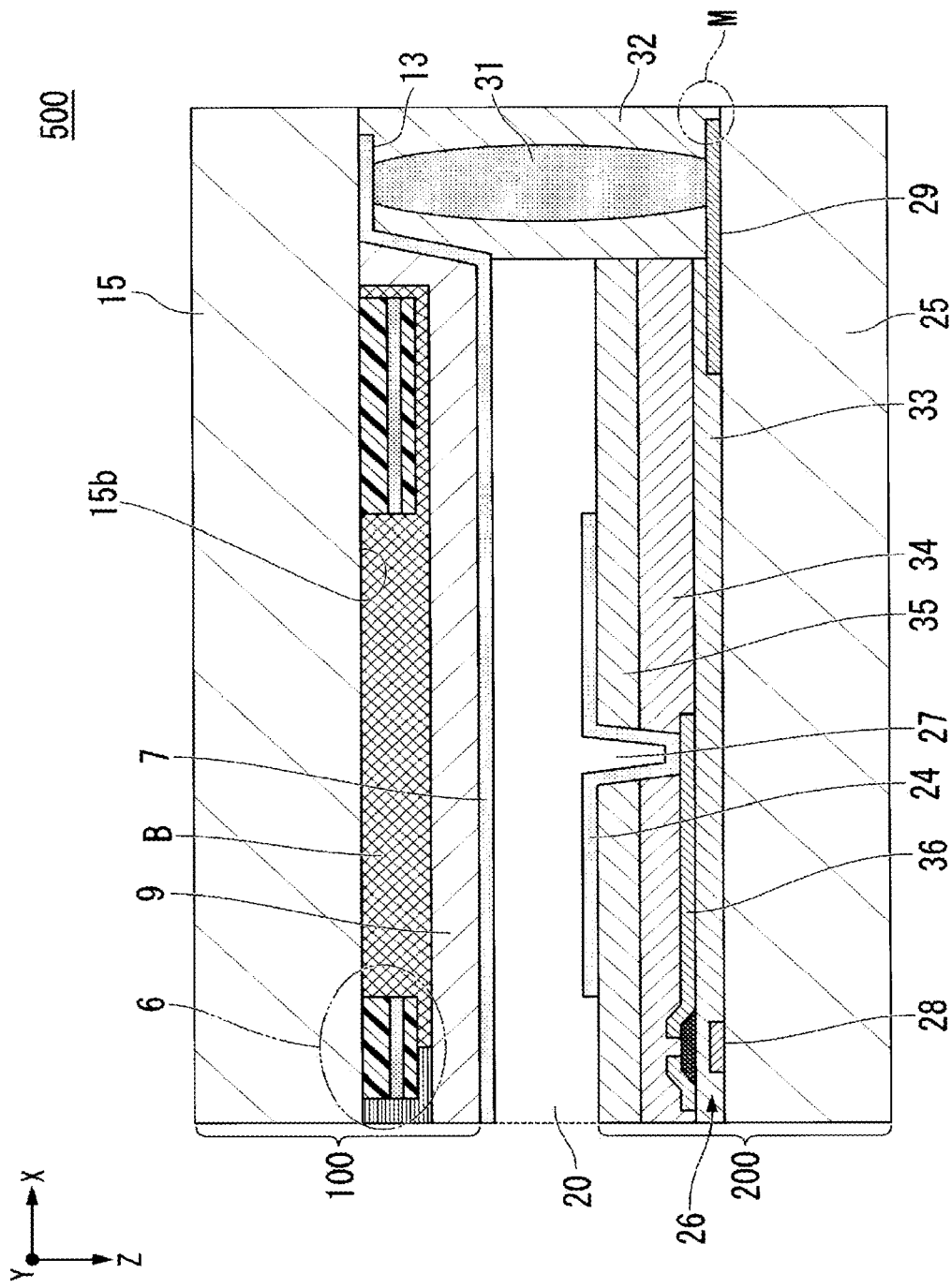
FIG. 9A is a cross-sectional view showing a part of the liquid crystal display device according to the third embodiment of the present invention, i.e. a schematic view showing a cross section taken along E-E' line of FIG. 8 and a cross section of an end portion of the liquid crystal display device.

FIGS. 6 and 9A are cross sections each showing a part of the liquid crystal display device according to the present embodiment. The liquid crystal display device is provided with a known optical film such as a polarizing plate, an alignment film, a cover glass (protection glass) and the like. However, these components are omitted in FIGS. 6 and 9A. FIG. 9A is a schematic view showing a cross section taken along E-E line of FIG. 8 and a cross section at an end portion of the liquid crystal display device. To make understanding of the embodiment easier, a cross section of the liquid crystal display device is schematically illustrated in FIG. 9A. However, a positional relationship between the pixel portion (pixel electrode) and the conductive portion in FIG. 9A differs from that of the real structure.

In the display device 500 (hereinafter referred to as liquid crystal display device 500) according to the third embodiment, the black electrode substrate 100 according to the first embodiment of the present invention is used.

The liquid crystal display device 500 is provided with the black electrode substrate 100, the array substrate 200, and the liquid crystal layer 20 sandwiched between the substrates 100 and 200, so as to form a liquid crystal cell.

The first surface 15a of the black electrode substrate 100 serving as a touch sensing input surface is located at a front surface side of the liquid crystal display device 500 to form a display surface.

(Liquid Crystal Layer)

The liquid crystal layer 20 is used for a liquid crystal drive method using VA method (Vertically Alignment method: vertical electric field method using liquid crystal molecules of vertical alignment) in which the initial alignment direction of the liquid crystal is perpendicular to respective surfaces of the black electrode substrate 100 and the array substrate 200. In the VA method, the liquid crystal layer 20 operates in response to voltage applied in the thickness direction Z (vertical direction), and the liquid crystal display device 500 displays video images or the like.

The liquid crystal drive method applicable to the vertical field type method can be appropriately selected from HAN (Hybrid-aligned Nematic), TN (Twisted Nematic), OCB (Optically Compensated Bend), CPA (Continuous Pinwheel Alignment), ECB (Electrically Controlled Birefringence), TBA (Transverse Bent Alignment) and the like.

As a driving method of the liquid crystal layer 20, a liquid crystal drive method may be a common inversion drive method, or a method in which the pixel electrode is inversion-driven while the common electrode is driven at a constant voltage, thereby applying voltage to the liquid crystal layer 20 so as to drive the liquid crystal layer 20.

(Transparent Conductive Wiring)

Next, a transparent conductive wiring provided in the liquid crystal display device 500 will be described.

In addition to the structure of the black electrode substrate 100 described in the first and second embodiments, a transparent conductive wiring 7 is provided on the transparent resin layer 9 of the black electrode substrate 100. The transparent conductive wiring 7 is used as both of a function of the touch sensing and a function of a common electrode (drive electrode of liquid crystal).

In the liquid crystal display device 500, the liquid crystal layer is driven by applying a voltage between the transparent conductive wiring 7 as a common electrode and the pixel electrode 24 (described later) included in the array substrate 200.

As shown in FIG. 6, the black wirings 6 of the black electrode substrate 100 are arranged along the X-direction in a stripe pattern extending in the Y-direction perpendicular to the paper surface. Similarly, the black electrode patterns 60 composed of the black wirings 6 are also arranged in the X-direction (See FIG. 3). A plurality of transparent conductive wirings 7 are arranged on the transparent resin layer 9 of the black electrode substrate 100. The transparent conductive wirings 7 are arranged in the Y-direction in a stripe pattern extending in the X-direction. The black wiring 6 and the transparent conductive wiring 7 are arranged orthogonally crossing each other via the transparent resin layer 9 which is dielectric.

Figure 7:
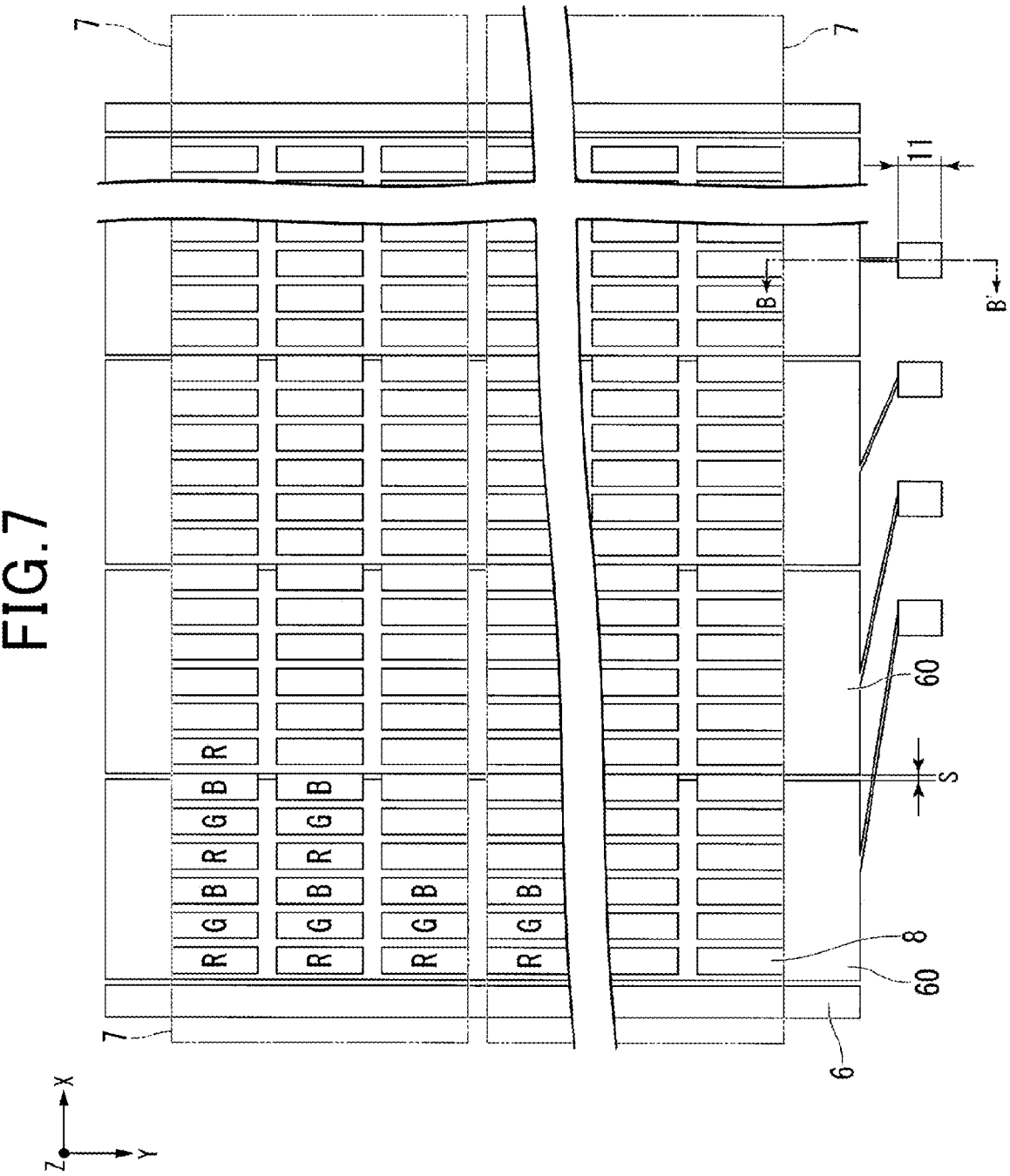
FIG. 7 is a plan view showing a planar pattern of the black electrode substrate forming the liquid crystal display device according to the third embodiment of the present invention.

FIG. 7 is plan view showing the black electrode substrate 100 shown in FIG. 6, as viewed from the film-surface of the transparent conductive electrode 7, and showing an example of the black electrode substrate 100. The Y-direction along which the black electrode pattern 60 composed of the black wiring 6 extends and the X-direction along which the transparent conductive layer 7 extends are orthogonally crossed each other, and the transparent conductive wiring 7 having large width in the Y-direction and the plurality of black wirings 6 are arranged being overlapped each other. For example, the pixel pitch in the X-direction is set to 21 µm, the line width of the black wiring 6 is set to 4 µm, and the line width of the transparent conductive wiring 7 is set to 123 µm (pitch of the transparent conductive layer 7 is set to 126 µm). In FIG. 7, when focused on one black electrode pattern 60, one transparent conductive wiring 7 and six black wirings 6 are orthogonally crossed each other. Adjacent black electrode patterns 60 are electrically separated by the slit S. The width of the slit S can be 1 µm to 4 µm In a configuration in which the black electrode substrate 100 is integrated to the liquid crystal display device 500, a metal wiring provided in the array substrate is located below the slit S, whereby light leakage from the liquid crystal display device can be avoided. Although not shown, the red layer R and the blue layer B are formed being overlapped each other (color overlapping) in a portion where the slit S is provided in the present embodiment, to thereby suppress the light leakage produced from the liquid crystal display device 500. Respective black wirings 6 having a thin line width is capable of forming fringe capacitance along the direction in which the wirings are extended, so that high S/N ratio can be produced by large fringe capacitance.

For example, according to the present embodiment, the transparent conductive wiring 7 is a common electrode and serves as a detection electrode which composes a touch sensing electrode. The black electrode pattern 60 provided with the black wiring 6 serves as a drive electrode composing the touch sensing electrode. Substantially constant electrostatic capacitance C5 is formed between the black electrode pattern 60 and the transparent conductive layer 7 (see FIG. 6). In the case where a finger or a pointer or the like contacts or approaches the black electrode substrate 100, electrostatic capacitance changes at a portion corresponding to the location of the finger or the pointer or the like, thereby detecting the touch-input location.

The present embodiment employs a configuration of detecting a change in the electrostatic capacitance produced between the black electrode pattern 60 having a group composing a plurality of black wirings 6 and the transparent conductive wiring 7. However, the present invention is not limited to this configuration. The above-described configuration using the black electrode pattern 40 may not be used. However, a plurality of individual black wiring can be provided on the black electrode substrate 100. In this case, for example, a drive method can be used in which 5 black wirings are thinned out from 6 black wirings (removed), and a scan signal is sent to the one black wiring, thereby driving (scanning) the black wiring being thinned out. As a result, a high speed touch sensing can be accomplished.

The transparent conductive wiring 7 is designed to have constant voltage for both the touch sensing driving and liquid crystal driving. Thus, by designing the voltage of the transparent conductive wiring 7 in this way, the touch sensing and the liquid crystal driving can be driven at different frequencies. According to the liquid crystal display device 500, large fringe capacitance is achieved and power consumption can be reduced by lowering required drive voltage of the touch sensing drive, while high S/N ratio is maintained.

(Array Substrate)

Next, with reference to FIGS. 6, 8, 9 and 10, the array substrate 200 provided in the liquid crystal display device 500 will be described. As shown in FIG. 6, the array substrate 200 is provided with a transparent substrate 25, the insulation layers 33, 34, and 35 disposed successively on the transparent substrate 25, and the pixel electrode 24 provided on the insulation layer 35. The pixel electrode 24 is electrically connected to an active element 26 (thin film transistor) via a contact hole 27 (see FIG. 9A). Each of the active elements 26 is disposed adjacent to the corresponding one of the plurality of pixel opening portions 8. Further, as shown in FIG. 9A, the array substrate 200 includes a first metal wiring 29 disposed at a seal portion 32 or the like of the liquid crystal display device 500. The first metal wiring 29 is formed together with a gate electrode 28 (described later) using the same process and the same material. The liquid crystal layer 20 is sealed on the inner side of the seal portion 32 and between the transparent conductive wiring 7 and the pixel electrode 24. The first metal wiring 29 may have a laminated structure in which a copper-containing layer and two indium-containing layers are laminated, the copper-containing layer containing at least copper and being sandwiched by the two indium-containing layers each containing indium.

FIG. 8 is an enlarged plan view of a pixel in the array substrate 200.

The array substrate 200 includes, on a major surface of the transparent substrate 25 which faces the liquid crystal layer 20, a plurality of pixel electrodes 24, a plurality of thin film transistors 26, a second metal wiring 40 and a plurality of insulation layers 33, 34 and 35. More specifically, the plurality of pixel electrodes 24 and the plurality of thin film transistors 26 are provided on the major surface of the transparent substrate 25 via the insulation layers 33, 34 and 35. In FIG. 6, only the thin film transistor 6 is not illustrated. In FIG. 8, the insulation layers 33, 34, and 35 are not illustrated.

The second metal layer 40 has a plurality of signal lines 41 (source line, source electrode), scanning lines 42 (gate line) and auxiliary capacitance lines 43. Each scanning line 42 is connected to the gate electrode 28. The signal line 41, the scanning line 42 and the auxiliary capacitance line 43 have the same wiring structure as the black wiring 6. Thus, the source electrode and the drain electrode which compose the active element 26 are formed of the second metal wiring 40 having three layered structure of the indium-containing layer/copper/indium-containing layer. In other words, the second metal wiring 40 has a laminated structure in which a copper-containing layer and two indium-containing layers are laminated, the copper-containing layer containing at least copper and being sandwiched by the two indium-containing layers each containing indium. The second metal wiring 40 is formed on the insulation layer 35 on the first metal wiring 29. The second metal wiring is formed into a film by a manufacturing process different from that of the first metal wiring 29.

Each of the pixel electrodes 24 has a known configuration, being provided on the surface of the insulation layer 35 facing the liquid crystal layer 20, and being disposed to face the pixel opening portion 8 surrounded by the black wiring 6.

A channel layer 46 of each thin film transistor 26 can be formed by a silicon semiconductor such as poly-silicon or the like, or an oxide semiconductor. The thin film transistor 26 preferably includes the channel layer 46 which is formed of an oxide semiconductor, such as IGZO (registered trade mark), containing two or more metal oxides selected from gallium, indium, zinc, tin and germanium. That is, the channel layer 46 is formed of InGaZnO-group metal oxide. The thin film transistor 26 having such a structure has high memory properties (less leak current), whereby the pixel capacitance after application of liquid crystal display voltage can be held easily. As a result, the auxiliary capacitance line 43 can be omitted from the configuration.

The thin film transistor including an oxide semiconductor as a channel layer has a bottom-gate type structure, for example. For the thin film transistor, a transistor structure such as a top gate type, or a double gate type may be used. The thin film transistor having a channel layer of the oxide semiconductor can be used for an optical sensor or other active elements.

The thin film transistor 26 in which the oxide semiconductor such as IGZO is used for the channel layer 46 has high electron mobility of applying a required drive voltage to the pixel electrode 24 in a short period of time, e.g., 2 msec (millisecond) or less. For example, in the case of double speed drive (the number of display frames per second is 120 frames), one frame corresponds to about 8.3 msec. Hence, for example, 6 msec can be allocated to the touch sensing operation. Since the transparent conductive wiring 7 serving as a drive electrode is at a constant voltage, the liquid crystal driving and the touch electrode driving do not have to be conducted in a time-sharing manner. The driving frequency of the pixel electrode for driving the liquid crystal, and the drive frequency of the touch electrode can be different from each other.

Also, since the thin film transistor 26 where the oxide semiconductor is used for the channel layer 46 has only small leak current as described above, the drive voltage applied to the pixel electrode 24 can be retained for a long period of time. The signal line, the scanning line, the auxiliary line or the like of the active element are formed with copper wiring having low wiring resistance, and the active element uses IGZO which can be driven in a short period of time, whereby a time margin can be extended in scanning operation of the touch sensing. Hence, a change in the electrostatic capacitance can be detected accurately. The oxide semiconductor such as IGZO is used for the active element so that a driving time of the liquid crystal or the like can be shortened, thereby producing a sufficient time for the touch sending operation during the video signal processing of the entire display screen.

The drain electrode 36 extends to the center portion of the pixel from the thin film transistor 26, and connected to the pixel electrode 24 as a transparent electrode via the contact hole 27. The source electrode 55 extends from the thin film transistor 26 so as to be electrically connected to the signal line 41.

(Outer Peripheral Structure 1 of Liquid Crystal Display Device 500)

FIG. 9A is a diagram illustrating an outer peripheral structure of the liquid crystal display device 500 according to the present embodiment. FIG. 9A illustrates an example of an electrical connection between the transparent conductive wiring 7 and the array substrate 200. The transparent conductive wiring 7 is included in the black electrode substrate 100 provided with the black touch sensing electrode (i.e., black electrode pattern 60). The transparent conductive wiring 7 included in the black electrode substrate 100 is formed to cover a plane of the transparent resin layer 9 located in the display region 15c and to cover an end portion of the transparent resin layer 9 located in the outer region 15d. Moreover, the transparent conductive wiring 7 is formed covering an inclined surface formed in the end portion of the transparent resin layer 9, and a joint portion between the end portion of the transparent resin layer 9 and the second surface 15b of the black electrode substrate 100, and extending towards the outside of the liquid crystal cell. In the outer region 15d, the transparent conductive wiring 7 formed on the black electrode substrate 100 configures the terminal portion 13. In the outer region 15d, the seal portion 32 and a conductive portion 31 are formed, covering the terminal portion 13. The terminal portion 13 is connected to the first metal wiring 29 of the array substrate 200 via the conductive portion 31. The first metal wiring 29 can be formed within the same layer as the gate electrode 28 or the gate line. The first metal wiring 29 electrically connected to the transparent conductive wiring 7 via the conductive portion 31 is maintained at a constant voltage.

Figure 9B:
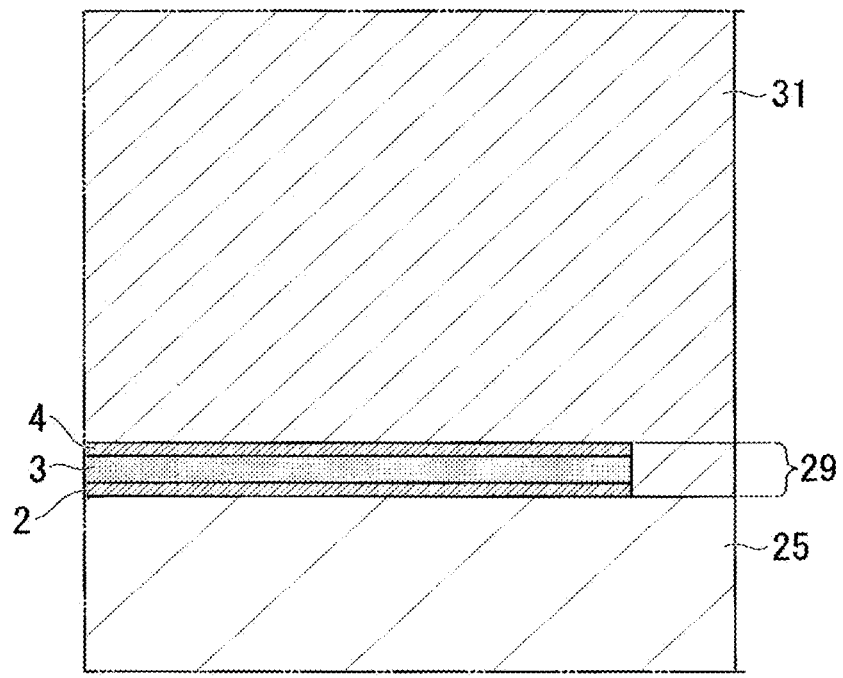
FIG. 9B is a cross-sectional view showing an enlarged end portion of the liquid crystal display device according to the third embodiment of the present invention, i.e. an enlarged diagram showing a portion indicated by a symbol M of FIG. 9A.

FIG. 9B is an enlarged diagram illustrating a portion designated by a reference sign M in FIG. 9A. The first metal wiring 29 provided on the transparent substrate 25 has a three-layer structure, similar to the configuration of the black wiring 7 described in the first embodiment, including the first indium-containing layer 2, the copper-containing layer 3 and the second indium-containing layer 4. According to the present embodiment, the first indium-containing layer 2 having a thickness of 20 nm is formed using ITO (In—Sn—O). The copper-containing layer 3 having a thickness of 200 nm is formed by using a copper magnesium alloy containing 0.5 at % magnesium (Mg). The second indium-containing layer 4 having a thickness of 20 nm is formed by using a copper magnesium alloy containing 22 at % indium. ITO is formed into a film using sputtering method under the room temperature condition to form amorphous, thereby forming the first indium-containing layer 2. The first indium-containing layer 2, the copper-containing layer 3, and the second indium-containing layer 4 can be readily and collectively processed by wet etching. Reflection color of the surface of the copper indium alloy is nearly gray so that red coloration due to single use of copper can be avoided and also reflectance can be lowered.

The first metal layer 29 according to the present embodiment is formed such that copper or copper alloy (copper-containing layer 3) is sandwiched by the indium-containing layers, so that the adhesion strength with the transparent substrate such glass can be improved. Further, electrical connection on the first metal layer 29 becomes stable so as to achieve good terminal structure. According to the present embodiment, the black electrode pattern 60 extends in the Y-direction and the transparent conductive wiring 7 extends in the X-direction. The present invention is not limited to such a structure, but the black electrode pattern 60 may extend in the X-direction and the transparent conductive wiring 7 may extend in the Y-direction.

In such a configuration, the indium-containing layer is sandwiched between the transparent conductive wiring 7 and the conductive portion 31. In this case, the indium-containing layer enhances electrical connectivity between the transparent conductive wiring 7 and the conductive portion 31. Accordingly, electrical contact can readily be made between the first metal wiring 29 and the transparent conductive wiring 7.

(Outer Peripheral Structure 2 of Liquid Crystal Display Device 500)

Figure 10:
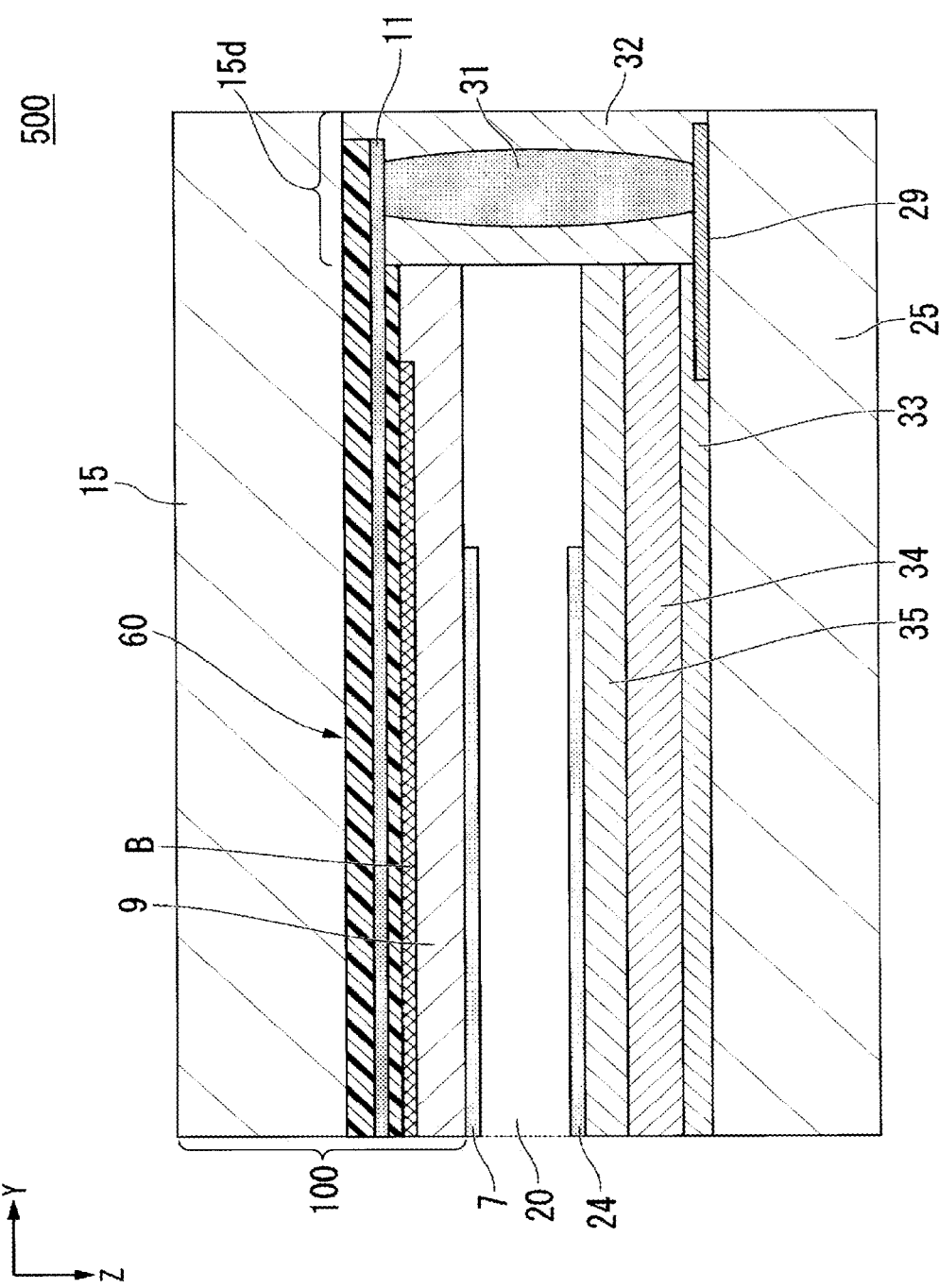
FIG. 10 is a cross-sectional view taken along a B-B' line of FIG. 7, showing a part of an end portion of the liquid crystal display device according to the third embodiment of the present invention.

FIG. 10 is a diagram showing an outer peripheral structure of the liquid crystal cell in the liquid crystal display device according to the present embodiment. FIG. 10 illustrates a cross section taken along line B-B' of FIG. 7 and an example of electrical connection between the black electrode pattern 60 of the black electrode substrate 100 and the array substrate 200. In a manufacturing process of forming the blue layer B in the pixel opening portion 8 shown in FIG. 7, the blue layer B may be formed not only in the pixel opening portion 8, but also outside the pixel opening portion 8 (region where the pixel opening portion 8 is not formed), such that the blue layer B is located on the black electrode pattern 60 which extends towards the outer region 15d from the display region 15c. Considering this situation, FIG. 10 shows a configuration where the blue layer B is provided between the transparent resin layer 9 and the black electrode pattern 60.

In the outer region 15d, the second indium-containing layer 4 of the black electrode pattern 60 is exposed. In the display region 15c, the second black layer 5 is covered by the transparent resin layer 9. In particular, in a laminated structure of the black electrode pattern 60 provided in the outer region 15d, the second black layer 5 is removed by etching which will be described later, and the second indium-containing layer 4 is exposed so as to form the terminal portion 11. The terminal portion 11 is connected to the first metal wiring 29 provided on the transparent substrate 2 (i.e., array substrate 200) via the conductive portion 31. The structure of the first metal wiring 29 and the structure of the conductive portion 31 are similar to those of FIG. 9A. A driving voltage is supplied to the first metal wiring 29 electrically connected to the black electrode pattern 60 via the conductive portion 31, the driving voltage being a voltage related to touch sensing driving and relatively supplied to the transparent conductive wiring 7 having the constant voltage.

According to this configuration, the second indium-containing layer 4 of the black electrode pattern 60 is sandwiched between the copper-containing layer 3 and the conductive portion 31. In this case, the second indium-containing layer 4 enhances electric connectivity between the copper-containing layer 3 and the conductive portion 31. Accordingly, electrical contact between the first metal wiring 29 and the copper-containing layer 3 can readily be accomplished.

In the liquid crystal display device 500 having the above-described configuration, the control unit 120 controls the liquid crystal driving and the touch sensing driving. When the touch sensing operation is performed, the black electrode pattern 60 is permitted to serve as a drive electrode and the transparent conductive wiring 7 is permitted to serve as a detection electrode having a constant voltage, to thereby differentiate a drive condition of the touch sensing and a drive condition (e.g., frequency or voltage) of the liquid crystal layer 20. Since frequencies for driving the touch sensing and the liquid crystal driving are different from each other, the touch sensing driving and the liquid crystal driving are unlikely to influence from each other. For example, a driving frequency of the touch sensing can be within a range from several KHz to several tens of KHz, and the driving frequency of the liquid crystal can be within a range from 60 Hz to 240 Hz. Further, the touch sensing driving and the liquid crystal driving can be performed in a time-sharing manner. In the case where the black electrode wiring 6 is used as a drive electrode (touch sensing drive scanning electrode), scanning frequency for detecting the electrostatic capacitance can be adjusted as desired, depending on a required speed of the touch input. Alternatively, in the touch sensing driving, the transparent conductive wiring 7 may be permitted to serve as a drive electrode, and the black electrode pattern 60 may be served as a detection electrode. In this case, the transparent conductive wiring 7 serves as a drive electrode (scanning electrode) to which voltage having constant frequency is applied. In the touch sensing driving and the liquid crystal driving, voltage (alternating current (AC) signal) may be applied to the drive electrode with an inverting driving method in which positive and negative voltages are inverted. The touch sensing operation and the liquid crystal driving may be or may not be performed in a time-sharing manner.

In applying the touch sensing drive voltage, voltage amplitude (peak to peak) of the AC signal to be applied may be decreased to reduce the influence of the touch sensing drive voltage to the liquid crystal display.

According to the liquid crystal display device 500 of the present embodiment, the black wiring 6 included in the black electrode pattern 60 has a laminated structure composed of the first black layer 1, the first indium-containing layer 2, the copper-containing layer 3, the second indium-containing layer 4 and the second black layer 5. Therefore, adhesion strength between the first black layer 1 and the copper-containing layer 3 can be improved by the first indium-containing layer 2, and adhesion strength between the copper-containing layer 3 and the second black layer 5 can be improved by the second indium-containing layer 4. Accordingly, the copper-containing layer 3 is prevented from being peeled off from the first black layer 1, and the second black layer 5 is prevented from being peeled off from the copper-containing layer 3. Further, since the copper-containing layer 3 is sandwiched by the first indium-containing layer 2 and the second indium-containing layer 4, electrical connectivity between an electrode or a terminal connected to the copper-containing layer 3, and the copper-containing layer 3 can be improved. In particular, the second indium-containing layer 4 laminated on the copper-containing layer 3 is exposed from the terminal portion 11, whereby electrical connectivity between the conductive portion 31 and the copper-containing layer 3 can be improved.

Furthermore, in the black electrode pattern 60, the black wiring 6 extends in the X-direction and the Y-direction, and the black wiring 6 extending in the X-direction and the black wiring 6 extending in the Y-direction 6 are connected to form a lattice pattern. Hence, when pressing force is applied to the first surface 15*a* as a touch sensing input surface, force propagated to the black wiring 6 is divided, along the lattice pattern, into the X-direction and the Y-direction which are extending direction of the black wiring 6. Thus, since the black wiring 6 has a two-dimensional lattice pattern, strength against the pressing force applied to the first surface 15*a* is enhanced. As a result, high adhesion strength is obtained to prevent peeling of the copper-containing layer 3 from the first black layer 1 and the second black layer 5, and also the black wiring 6 having high mechanical strength is accomplished, in a view point of stress dispersion. In other words, since the black wiring 6 has a two-dimensional lattice pattern, an effect of preventing peeling of the copper-containing layer 3 from the first black layer 1 and the second black layer 5 can be synergistically obtained.

Further, to serve as a touch-sensing input surface, the first surface 15*a* of the black electrode substrate 100 is located on a front surface side of the liquid crystal display device 500 to form a display surface. Therefore, when the liquid crystal display device 500 is used, pressing force is applied to the first surface 15*a* with the user's touch input. Due to occurrence of the pressing force, a stress occurs in the transparent substrate 15. The stress is propagated in the transparent substrate 15 towards the second surface 15*b* from the first surface, and then reaches the second surface 15*b*. The force due to the stress propagating in the transparent substrate 15 is applied to the black wiring 6 provided in the second surface 15*b*.

Moreover, when the user does not use the liquid crystal display device 500, for example, the liquid crystal display device 500 is often put in a pocket of the user's clothes or in a bag which the user carries. In this case, unintentional external force may be applied to the first surface 15*a* of the black electrode substrate 100. As a result, unintentional external force may be applied to the black wiring 6. Further, the black electrode substrate may be bent. In other words, it is considered that the black electrode substrate 100 is most likely to be affected by the external force among the components configuring the liquid crystal display device 500.

In contrast, even in a case where the liquid crystal display device 500 is exposed to the above-mentioned usage environment or storage environment, since the indium-containing layer improves the adhesion strength of the copper-containing layer 3 with the first black layer 1 and the second black layer 5, the copper-containing layer 3 can be prevented from being peeled off. Further, the indium-containing layer can improve the electrical connectivity between the conductive portion 31 and the copper-containing layer 3. Since high strength is obtained by the black wiring 6 having the two-dimensional lattice pattern, an effect of preventing peeling of the copper-containing layer 3 from the first black layer 1 and the second black layer 5 can be synergistically obtained. In other words, tolerance of the black electrode substrate 100 and the liquid crystal display device 500 against external force can be enhanced.

Fourth Embodiment (Transverse Electric Field Type Liquid Crystal Display Device)

Next, with reference to FIG. 11, a liquid crystal display device according to a fourth embodiment of the present invention will be described. In the fourth embodiment, the same reference signs are applied to the same elements as the first to third embodiments, and the description is omitted or simplified.

As shown in FIG. 11, the liquid crystal display device 600 according to the present embodiment is provided with a black electrode substrate 100, an array substrate 300 having active elements, and a liquid crystal layer 620 sandwiched between the substrates 100 and 300 to form a liquid crystal cell.

The first surface 15*a* of the black electrode substrate 100 serving as a touch-sensing input surface is located at a front surface side of the liquid crystal display device 600 to form a display surface.

The array substrate 300 is provided with an active element (TFT) for driving a liquid crystal, a pixel electrode 324 for driving the liquid crystal, a common electrode 332, an insulation layer disposed between the pixel electrode 324 and the common electrode 332. The common electrode 332 serves as an electrode used for liquid crystal driving and a touch sensing electrode (i.e., touch sensing wiring).

The common electrode 332 extends in parallel to a gate line (i.e., metal wiring) that configures the active element.

In the initially aligned state, the liquid crystal layer 620 is aligned horizontally to the surface of the transparent substrate 25. The liquid crystal driving is controlled by the active element, and the liquid crystal is driven by fringe field produced between the pixel electrode 324 and the common electrode 332. This liquid crystal driving method is referred to as FFS (fringe field switching), or IPS (in-plane switching). The common electrode 332 has an opening having substantially the same width as the pixel opening portion 8 in plan view, and has a stripe shape extending in the X-direction perpendicular to a direction (Y-direction) along which the black electrode pattern 60 extends. For the touch sensing, an electrostatic capacitance C6 which is substantially constant is formed between the black electrode pattern 60 and the common electrode 332.

Unlike the third embodiment, the transparent conductive wiring 7 does not have to be formed in the black electrode substrate 100. According to the configuration shown in FIG. 11, liquid crystal driving and the touch sensing driving with the common electrode 332 are performed in a time-sharing manner. The liquid crystal display driving and the touch sensing driving are controlled by the control unit 120 shown in FIG. 5. The common electrode 332 is formed of the transparent conductive film such as ITO. FIG. 11 omits illustration of elements such as an active element for driving liquid crystal, an auxiliary capacitance, an alignment film, an optical film, or a cover glass.

According to the fourth embodiment, effects similar to the third embodiment can be obtained.

Fifth Embodiment (Transverse Field Type Liquid Crystal Display Device)

Next, with reference to FIG. 12, a liquid crystal display device according to a fifth embodiment of the present invention will be described. In the fifth embodiment, the same reference signs are designated to the same elements as the first to fourth embodiments, and the description is omitted or simplified.

As shown in FIG. 12, the liquid crystal display device 700 according to the present embodiment is provided with a black electrode display substrate 100, an array substrate 400 having active elements, and a liquid crystal layer 720 sandwiched between the substrates 100 and 400 to form a liquid crystal cell.

The first surface 15a of the black electrode substrate 100 serving as a touch-sensing input surface is located at a front surface side of the liquid crystal display device 700 to form a display surface.

The array substrate 400 is provided with an active element (TFT) for driving a liquid crystal, a pixel electrode 424 for driving the liquid crystal, a common electrode 432, a touch sensing wiring 439, an insulation layer disposed between the pixel electrode 424 and the common electrode 432, and an insulation layer disposed between the common electrode 432 and the touch sensing wiring 439. The common electrode 432 serves as an electrode used for liquid crystal driving. The touch sensing wiring 439 extends in parallel to the gate wiring that configures the active element, serves as a touch sensing electrode used for the touch sensing driving, and has a stripe shape extending in the X-direction perpendicular to a direction (Y-direction) along which the black electrode pattern 60 extends. The touch sensing wiring 439 has a laminated structure in which a copper-containing layer and two indium-containing layers are laminated, the copper-containing layer containing at least copper and being sandwiched between the two indium-containing layers each containing indium.

In the initially aligned state, the liquid crystal layer 720 is aligned horizontally to the surface of the transparent substrate 25. The liquid crystal driving is controlled by the active element, and the liquid crystal is driven by fringe field produced between the pixel electrode 424 and the common electrode 432. This liquid crystal driving method is referred to as FFS (fringe field switching), or IPS (in plane switching). The common electrode 432 has an opening having substantially the same width as the pixel opening portion 8 in plan view. For the touch sensing, electrostatic capacitance C7 which is substantially constant is formed between the black electrode pattern 60 and the touch sensing wiring 439.

Unlike the third embodiment, the transparent conductive wiring 7 does not have to be formed in the black electrode substrate 100. According to the configuration shown in FIG. 12, liquid crystal driving in the common electrode 432, and driving of the touch sensing wiring 439 in the touch sensing do not have to be performed in a time-sharing manner. The frequency of the signal for driving the touch sensing wiring 439 and the frequency of the liquid crystal drive signal may be different from each other. The common electrode 432 is formed of a transparent conductive film such as ITO. The touch sensing wiring 439 is formed of the same metallic material as the gate line, with the same manufacturing process used for forming the gate line. The touch sensing wiring 439 and the metal wiring which configures the active element are electrically isolated from each other. The touch sensing wiring 439 can be used as a drive electrode or a detection electrode in the touch sensing function. The liquid crystal display driving and the touch sensing driving are controlled by the control unit 120 shown in FIG. 5. FIG. 12 omits illustration of elements such as an active element for driving liquid crystal, an auxiliary capacitance, an alignment film, an optical film, or a cover glass.

According to the fifth embodiment, effects similar to the third embodiment can be obtained.

Sixth Embodiment (Liquid Crystal Display Device Provided with Light Shielding Layer)

Figure 13A:
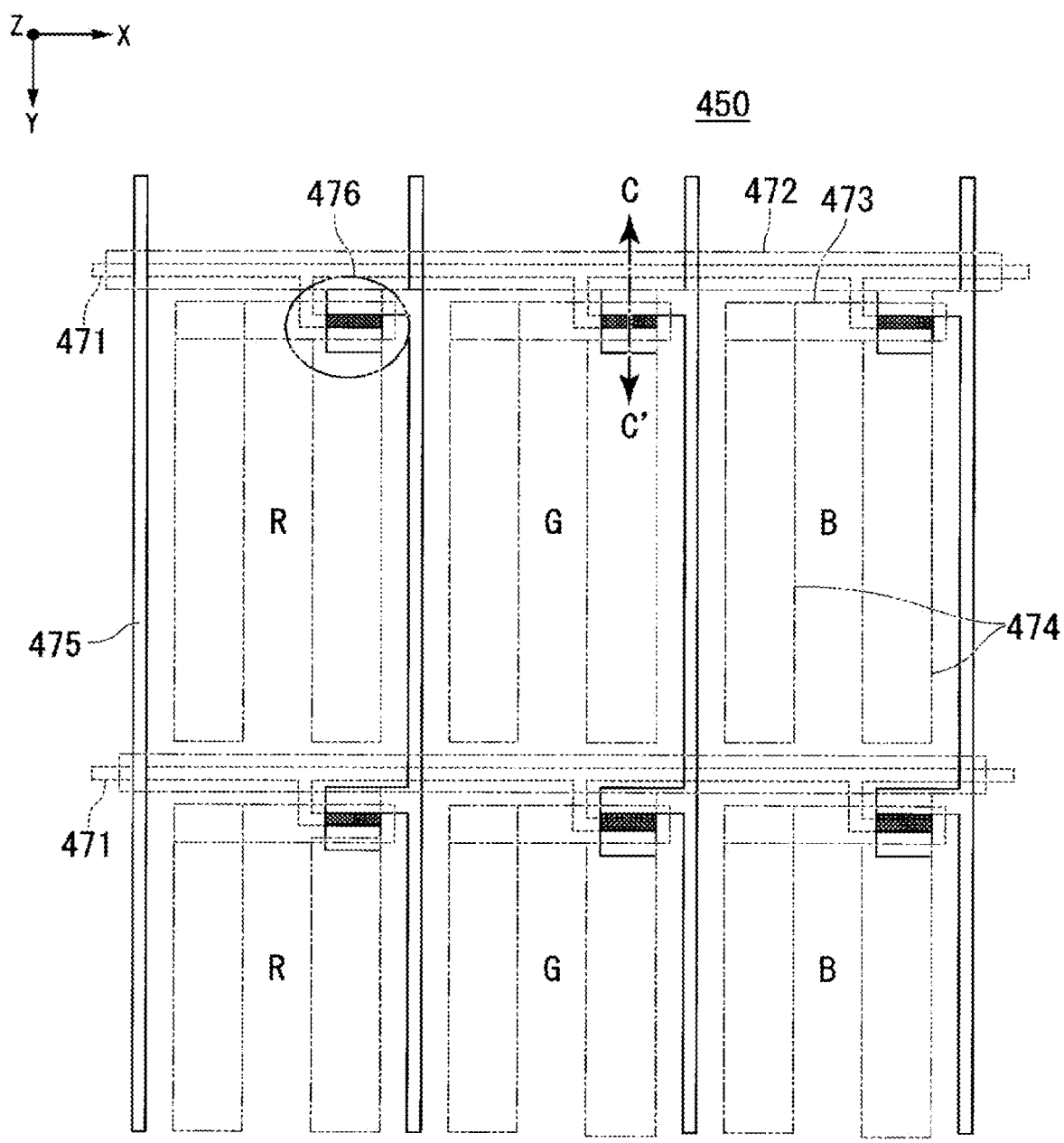
FIG. 13A is a partial plan view showing a display device according to a sixth embodiment of the present invention.
Figure 13B:
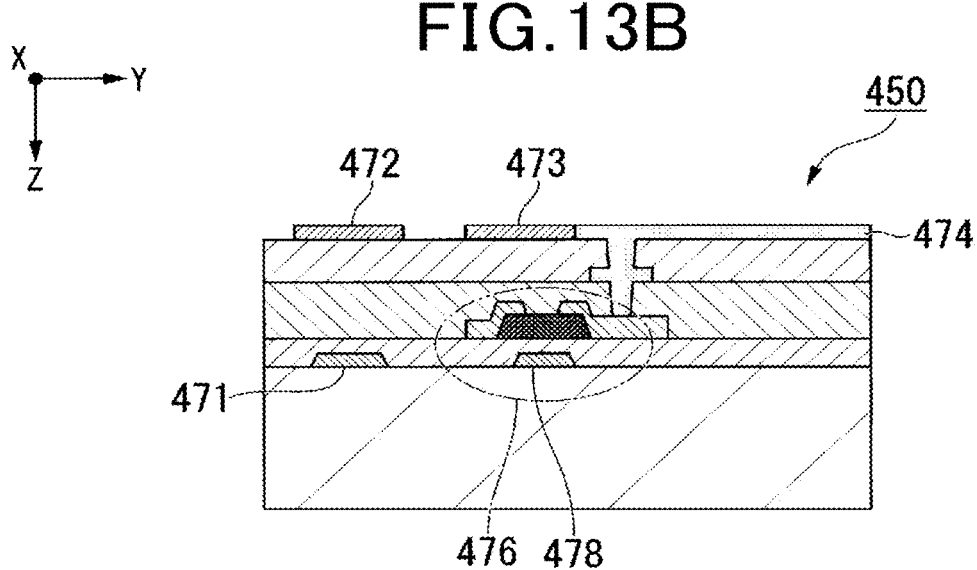
FIG. 13B is a partial cross-sectional view showing a display device according to the sixth embodiment of the present invention.
Figure 13C:
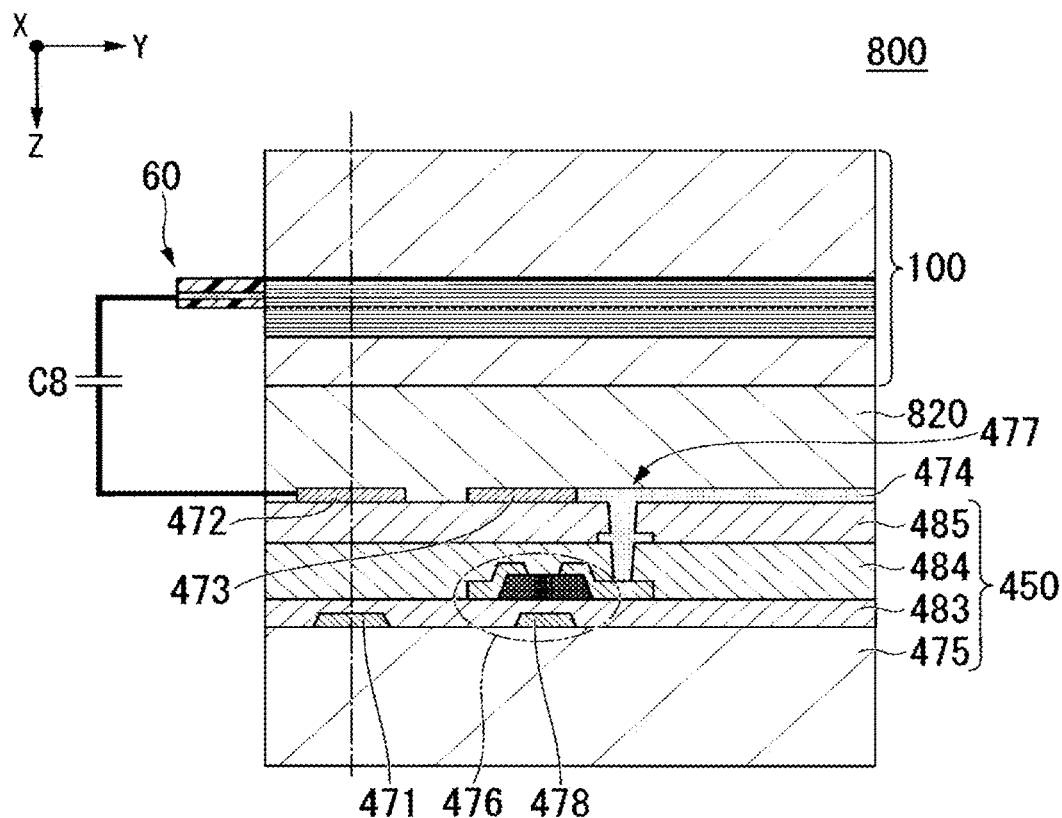
FIG. 13C is a partial cross-sectional view showing a display device according to the sixth embodiment of the present invention.

Next, with reference to FIGS. 13A to 13C, a liquid crystal display device according to a sixth embodiment of the present invention will be described. In the sixth embodiment, the same reference signs are applied to the same elements as the first to fifth embodiments, and the description is omitted or simplified. FIG. 13A is plan view showing a part of an array substrate 450 included in the liquid crystal display device according to the embodiment of the present invention. FIG. 13B is a partial cross sectional view take along the line C-C' of FIG. 13A. FIG. 13C is a cross sectional view showing a part of the array substrate 450 included in the display device of the embodiment of the present invention. FIGS. 13A to 13C omit illustration of elements such as a common electrode for driving liquid crystal, an auxiliary capacitance, an alignment film, an optical film, or a cover glass.

As shown in FIG. 13C, a liquid crystal display device 800 according to the present embodiment is provided with a black electrode display substrate 100, the array substrate 450 having active elements, and a liquid crystal layer 820 sandwiched between the substrates 100 and 450 to form a liquid crystal cell. The first surface 15a of the black electrode substrate 100 serving as a touch-sensing input surface is located at a front surface side of the liquid crystal display device 700 to form a display surface.

As shown in FIGS. 13A and 13B, the array substrate 450 is provided with a gate line 471 extending in the X-direction, a gate electrode 478 connected to the gate line 471, a source line 475 extending in the Y-direction, an active element 476, a touch sensing electrode 472 (touch sensing wiring), and a light shielding layer 473. As shown in FIG. 13C, the touch sensing electrode 472 is electrically isolated from the gate line 471, and disposed in parallel to the gate line 471 so as to overlap with the gate line 471 via insulation layers 483, 484 and 485. The touch sensing electrode 472 and the light shielding layer 473 are formed in the same manufacturing process using the same metallic material, and positioned in the same layer.

The configuration of the touch sensing electrode 472 and the metallic material forming the touch sensing electrode 472 are not limited. For example, configurations or material forming these configurations can be exemplified, including metals having high melting points such as titanium or molybdenum, a single layer or a laminated layer configuration containing aluminum or aluminum alloy, three-layer configuration of titanium/copper/titanium, or three-layer configuration of indium-containing layer/copper alloy/indium-containing layer. Moreover, to improve display visibility, a black layer can be formed on the touch sensing electrode 472. An insulation layer made of silicon oxide or silicon oxynitride may be formed on the touch sensing electrode 472 and the light shielding layer 473. To reduce electrical noise, it is preferable to form the touch sensing electrode 472 in a simple shape such as stripe shape. However, to improve light shielding properties, a pattern shape in which the touch sensing electrode 472 and the light shielding layer 473 are connected can be used. In plan view, the touch sensing electrode 472 extending in the X-direction orthogonally crosses the black electrode pattern 60 which extends in the Y-direction. The touch sensing electrode 472 serves as a touch sensing electrode. In the touch sensing operation, as described in the above embodiment, thinned-out driving can be performed. Specifically, according to the configuration having a plurality of touch sensing electrodes 472 on the array substrate 450, 6 touch sensing electrodes are defined as one group, and a plurality of touch sensing electrode groups are provided to the array substrate 450. Then, 5 touch sensing electrodes are thinned out (removed) from the 6 electrodes, and a scan signal is transmitted to one touch sensing electrode. By this driving method, touch sensing electrode can be driven (scanned) with thinned-out touch sensing electrodes. In this case, removed (thinned out) 5 touch sensing electrodes are in an electrically floated state (i.e., floating).

As shown in FIG. 13B, the pixel electrode 474 which drives liquid crystal is electrically connected to the drain electrode included in the active element 476, via a contact hole.

In FIGS. 13B and 13C, the pixel electrode 474 is connected to the drain electrode via the light shielding layer 473. However, a structure to connect the light shielding layer 473 and the drain electrode is not limited to the structure shown in the present embodiment. The channel layer (semiconductor layer) in the active element 476 is covered by the light shielding layer 473 and shielded thereby.

During touch sensing operation, the electrostatic capacitance C8 is produced between the black wiring 6 provided in the black electrode substrate 100 and the touch sensing electrode. For example, the touch sensing electrode 472 can serve as a drive electrode and the black electrode 6 can serve as a detection electrode. When a finger or a pointer contacts or approaches the first surface 15a which is a touch sensing input surface, electrostatic capacitance changes and the black electrode wiring 6 detects the change so as to determine whether there has been a touch input. It should be noted that the touch sensing electrode 472 can serve as a detection electrode and the black electrode can serve as a drive electrode.

The material used for forming the channel layer included in the active element 476 may be an oxide semiconductor or a poly silicon semiconductor.

According to the present embodiment, the light shielding layer 473 shields backlight or external light so that various active elements can be used for the liquid crystal display device 800. The display device according to the embodiment of the present invention can be applied to HMDs (head mount displays) or liquid crystal projectors.

According to the sixth embodiment, effects similar to the third embodiment can be obtained.

Seventh Embodiment

Next, with reference to FIG. 3 and FIGS. 14A to 15, a manufacturing method of a black electrode substrate according to a seventh embodiment of the present invention will be described.

Figure 14A:
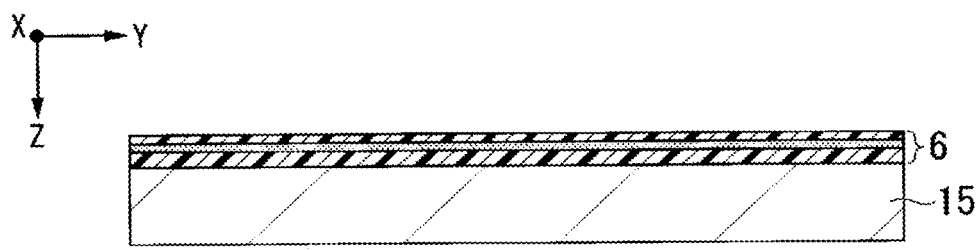
FIG. 14A is a diagram showing a manufacturing method of a black electrode substrate according a seventh embodiment of the present invention.
Figure 14B:
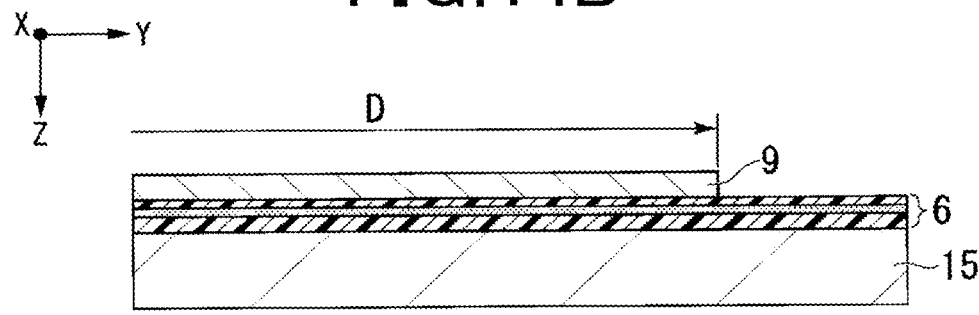
FIG. 14B is a diagram showing a manufacturing method of the black electrode substrate according the seventh embodiment of the present invention.
Figure 14C:
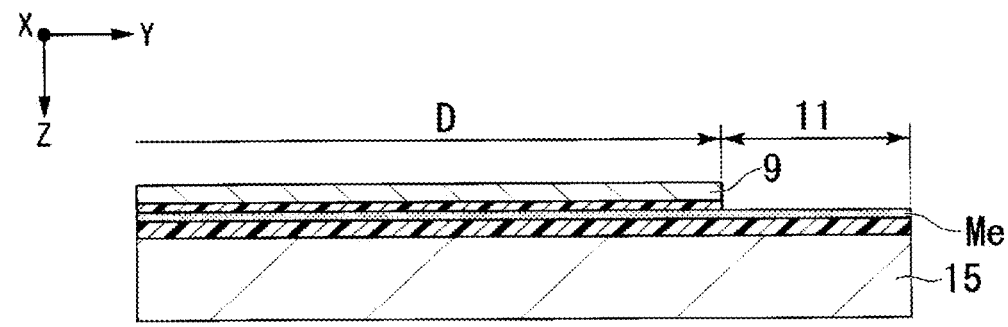
FIG. 14C is a diagram showing a manufacturing method of the black electrode substrate according the seventh embodiment of the present invention.
Figure 15:
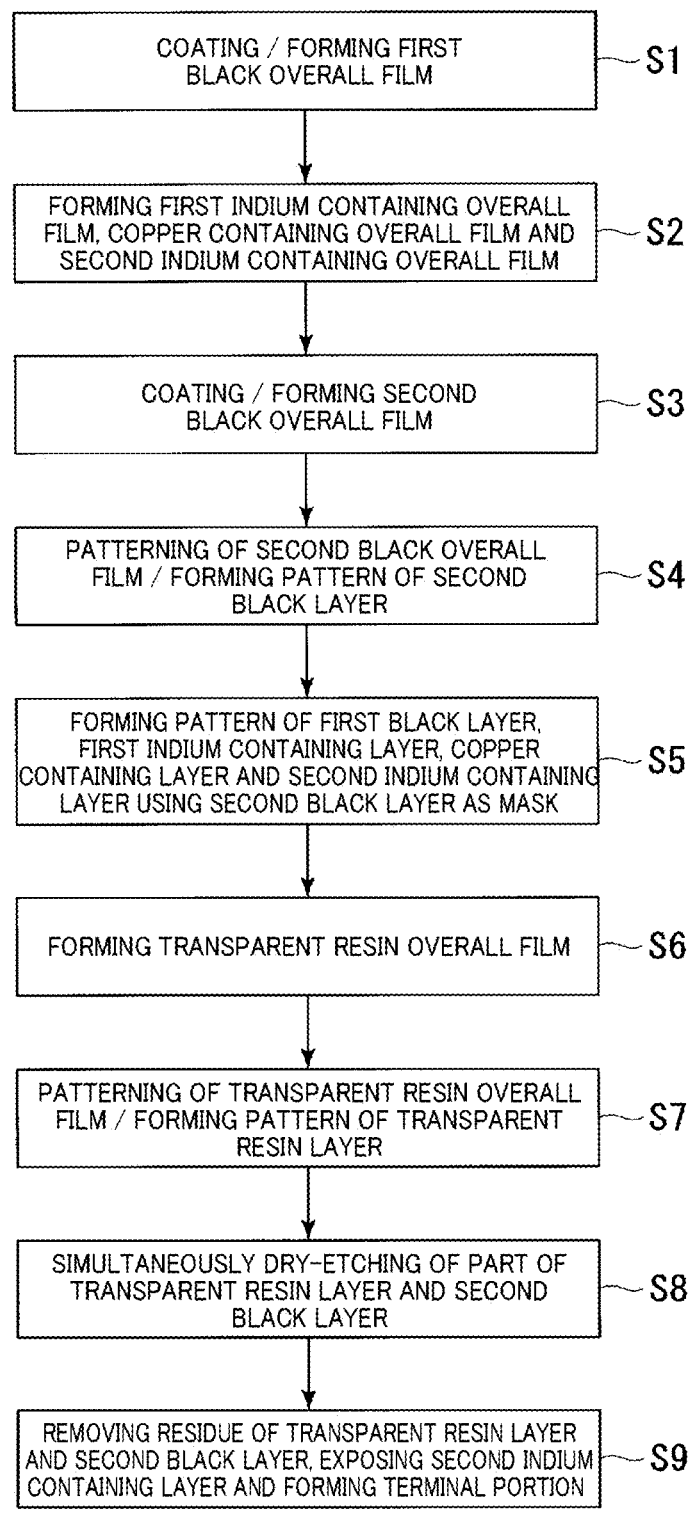
FIG. 15 is a flowchart showing a manufacturing method of the black electrode substrate according to the seventh embodiment of the present invention.

FIGS. 14A to 14C are cross-sectional views partly showing a manufacturing method of the black electrode substrate according to the embodiment of the present invention. FIG. 15 is a flowchart showing a manufacturing process of the black electrode substrate of the embodiment of the present invention. The manufacturing process according to the present embodiment includes forming the black electrode substrate described in the first embodiment, and further forming the transparent resin pattern is on the black electrode substrate. It should be noted that formation of the black electrode pattern 60 including the black wiring 6 can be followed by forming colored layer pattern on the pixel opening portion 8 to arrange a red layer, a green layer and a blue layer in the pixel opening portion 8, and further forming a transparent resin layer.

First, as shown in FIG. 14A, a transparent substrate 15 is prepared. The transparent substrate 15 includes a first surface 15a serving as a touch sensing input surface, a second surface 15b opposite to the first surface 15a, a display region 15c defined on the second surface 15b having a rectangular shape in plan view, an outer region 15d defined on the second surface 15b and positioned outside the display region 15c. The black electrode pattern 60 defined by the black wiring 6 is formed on the transparent substrate 15.

With reference to FIG. 15, a forming method of the black electrode pattern 60 will be described.

First, a black coating liquid containing carbon as a major color material is coated on the transparent substrate 15, followed by curing to form a first black overall film (Step S1). Thereafter, a first indium-containing overall film containing indium is formed on the first black overall film, followed by forming a copper-containing overall film containing copper on the first indium-containing overall film, which is further followed by forming a second indium-containing overall film containing indium on the copper-containing overall film (Step S2). Specifically, a laminate of the above-mentioned three overall films is laminated on the first black overall film by continuous film-formation, by using a vacuum film-forming apparatus. Next, a photosensitive black coating liquid capable of being alkali-developed (coating liquid containing carbon as a major color material) is used to form a second black overall film on the second black overall film (Step S3). As a black coating liquid, for example, acrylic photosensitive black coating liquid known as a black matrix material can be used. A color material used for the black layer composing the black electrode is preferably mainly a carbon. To adjust reflective color produced by the black layer, a small amount of organic pigment may be added to the photosensitive black coating liquid. However, most of organic pigments have a metal coordinated in the structure of the pigment. In the case where a film containing such a pigment is dry-etched, the coordinated metal may cause a contamination. Considering this, formulation of the photosensitive black coating liquid is adjusted.

Thereafter, with a known photolithography method, the second black overall film is exposed, developed and cured so as to form a second black layer 5 (Step S4). The patterned second black layer 5 has the same planar shape as the black electrode pattern 60 (a plurality of pixel opening portions 8, black wiring 6, terminal portion 11, slit S, lead wire) shown in FIG. 3.

Next, the second black layer 5 having the above-described planar pattern is used as a mask to perform wet etching for the first black overall film, the first indium-containing overall film, the copper-containing overall film and the second indium-containing overall film (Step S5). Thus, the black electrode pattern 60 defined by the black wiring 6 is formed. The black electrode pattern 60 has a laminated structure composed of the first black layer 1, the indium-containing layer 2, the copper-containing layer 3, the second indium-containing layer 4 and the second black layer 5. The second black layer 5, the first indium-containing layer 2, the copper-containing layer 3 and the second indium-containing layer 4 have substantially the same pattern.

Next, as shown in FIG. 14B, a transparent resin overall film containing a transparent resin material is formed on the transparent substrate 15 so as to cover the second black layer 5 (Step S6). Further, the transparent resin overall film is patterned so as to form the transparent resin layer 9 having a rectangular shape of the same size as the display region 15c in plan view (Step S7). In other words, the pattern of the transparent resin layer 9 is, as shown in FIG. 3, a pattern having a region exposed for forming the terminal portion 11 which is necessary for electrical mounting, and having substantially the same size as the display region 15c.

Subsequently, a part of the transparent resin layer 9 in the thickness direction (i.e., Z-direction) (portion close to the surface of the transparent resin layer 9) and the second black cooler layer 5 located onto the outer region 15d are removed by dry etching using fluorocarbon-based gas (Step S8). In other words, a part of the transparent resin layer 9 and the second black layer 5 are simultaneously dry-etched. Thus, even when the second black layer 5 is removed, the transparent resin layer 9 remains with a predetermined thickness. Specifically, a partial etching of the transparent resin layer 9 in the display region 15c and a complete etching of the second black layer 5 exposed to the outer region 15d are simultaneously performed. Taking the dry etching into consideration, the transparent resin layer 9 before being dry-etched has relatively a large thickness. Hence, as shown in FIG. 14C, the terminal portion 11 is formed in the outer region 15d, the terminal portion 11 having a surface Me where the second indium-containing layer 4 is exposed (Step S9).

In the process of removing a part of the transparent resin layer 9 and the second black layer 5 shown in the cross section view of FIG. 14C in the thickness direction, it is preferable to use a fluorocarbon-based gas such as $CF_4$ or $C_3F_8$ as a dry-etching gas. By using such a gas, the second black layer 5 can be removed by etching, without giving a large influence on the indium-containing layer or the copper-containing layer 3. It should be noted that argon or oxygen may be added to $CF_4$ or $C_3F_8$ gas or the like as needed.

Appropriate adjustments can be made to the pressure in the chamber where the gas used for the dry etching is introduced, a flow or a flow-ratio flow of the introduced gas, and output power or frequency of a high frequency power used for the etching.

Eighth Embodiment

Figure 16:
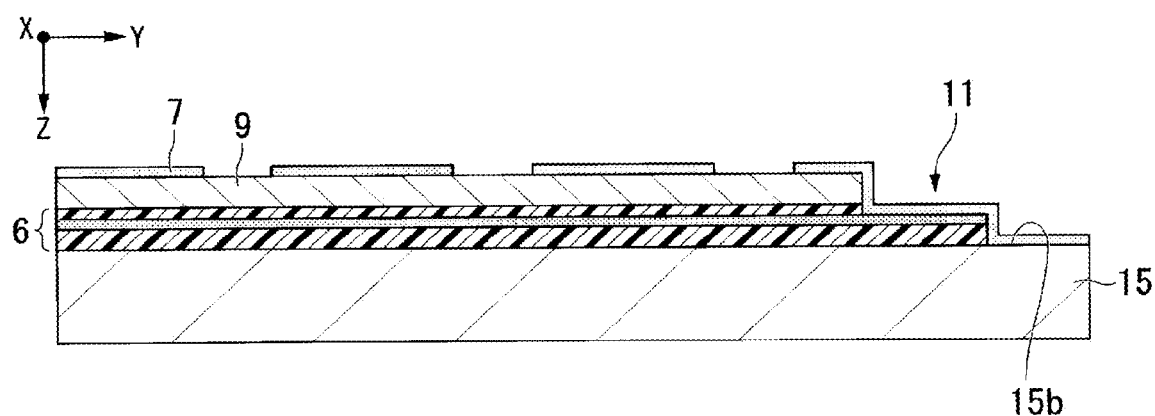
FIG. 16 is a partial cross-sectional view showing a modification of the black electrode substrate according to the first embodiment of the present invention.

The present embodiment is a modification of a terminal structure (shown in FIG. 14C) mentioned in the sixth embodiment. With reference to FIGS. 6, 7 and 16, an eighth embodiment will be described. In the vertical field type liquid crystal display device described in the third embodiment, as shown in FIGS. 6 and 7, the transparent conductive wiring 7 formed on the transparent resin layer 9 is formed to extend in the X-direction. When the transparent conductive wiring 7 is formed into a film on the transparent resin layer 9, a film is also formed in advance on a portion where the surface (second surface 15b) of the transparent substrate 15 is exposed, i.e. on the terminal portion 11 in the outer region 15d, using a conductive oxide such as ITO or the like. In other words, during the process for forming the transparent conductive wiring 7, an ITO film is simultaneously formed on the terminal portion 11 in the outer region 15d. In this case, since the ITO is a hard film similar to ceramic, the terminal portion 11 is unlikely to be scratched so that stable electrical mounting can be made on the terminal portion 11.

The display device according to the embodiments of the present invention can be used in various ways. Electronic equipment to which the display device according to the embodiments of the present invention can be applied includes cellular phones, portable game machines, portable information terminals, personal computers, electronic books, video cameras, digital still cameras, head-mount displays, navigation systems, sound-reproducing system (car audio, digital audio player or the like), copying machines, facsimiles, printers, printer composite apparatuses, vending machines, automatic teller machines (ATMs), personal identification devices, optical communication equipment or the like. The above-described embodiments can be combined as desired.

Preferred embodiments of the present invention have so far been described. However, these embodiments are only examples, and should not be construed as limiting the present invention. Additions, omissions, replacements, and other modifications can be made without departing from the scope of the present invention. Accordingly, the present invention should not be construed as being limited by the above description, but should be construed as being defined by the claims.

PTL 1 describes a configuration in which a transparent conductive layer and a light-shielding metal film which are laminated on a plastic film. However, the configuration disclosed in PTL 1 is difficult to be applied to the in-cell structure. Further, since the base material is made of film, the film base material cannot be applied to the high-definition color filter because of the above-mentioned reason. Specifically, the plastic film is likely to be influenced by heat or moisture, so that the dimensions of the plastic film are likely to change significantly. Therefore, it is difficult to align positions between a plurality of patterns including color patterns or black matrix patterns composing pixels of 400 ppi or more, and also difficult to reproduce the pixel pattern. Moreover, PTL 1 fails to teach combining the in-cell technique with the color filer (i.e., integration). For example, according to paragraph [0026] of PTL 1, aluminum is disclosed as a light-shielding metal film. In the manufacturing process of red pixels, green pixels, blue pixels and the black matrix, a photolithography technique is used by using an alkali development solution. However, since the metal pattern made of aluminum is corrosive with an alkali development solution, it is difficult to form the color filter. Furthermore, PTL 1 does not make mention of decline of visibility to the observer who observes the display device, caused by light reflection reflected at the surface of the light-shielding metal film.

PTL 2 describes a configuration where a light absorbing layer having low total reflectance and a conductive layer are laminated, and also disclose a touch panel (e.g., claim 25 of PTL 2). However, PTL 2 does not suggest incorporating the in-cell technique into the color filter (i.e., integration). For example, according to paragraphs [0071] and [0096], and example 2 of PTL 2, aluminum is exemplified as a material of the conductive pattern (or conductive layer). In the manufacturing process of red pixels, green pixels, blue pixels and the black matrix, a photolithography technique is used by using an alkali development solution. However, since the metal pattern is corrosive with an alkali development solution, it is difficult to form the color filter. For example, as recited in claim 14 of PTL 2, use of total reflectance of 3% or less is defined in a configuration provided with a light absorbing layer on an opposite surface with respect to the surface contacting the base material. However, according to examples 1 to 7, the measured wavelength of the total reflectance is 550 nm. According to PTL 2, e.g., FIGS. 11, 16 or FIG. 18, there is no disclosure of a configuration achieving the total reflectance 3% or less in light-wavelength region ranging from 400 nm to 700 nm of the visible light region. For example, since the reflectance shown in FIG. 18 shows a large reflectance in a blue region ranging from 400 nm to 500 nm, the color of light absorbing layer is not observed as black, but is observed as blue, which lowers the visibility.

According to claim 24 or example 3 of PTL 2, copper (Cu) is described as a metal forming the conductive layer. However, there is a concern that sufficient adhesive property of the base material cannot be obtained relative to copper, copper oxide, or copper-oxide nitride, in the case where a glass substrate such as non-alkali glass is used as a base material. For example, there is a practical problem that, in the case where a copper-containing film is formed on the base material using these materials, when Sellotape (registered trademark) or the like is adhered to the copper-containing film, and then the Sellotape is peeled off, the copper-containing film is easily peeled off from the base material. Therefore, PTL 2 does not disclose detailed technique in order to improve adhesive property in the configuration in which the conductive layer containing copper is formed on the base material.

PTL 3 describes a display device provided with touch sensing electrodes, a black region and a color filter layer to display color images, being disposed on an outer surface of the front substrate composing the display panel (e.g., PTL 3, claims 1, 2, or FIG. 3). The touch sensing electrodes are formed of a metallic material and overlap with the black region (black matrix) excluding the pixel opening region. Claim 7 of PTL 3 discloses a configuration where the transparent conductive layer is laminated on the touch sensing electrodes, however, a technique using a layer containing indium is not disclosed. Moreover, PTL 3 does not disclose a configuration in which a black colored layer containing carbon as a color material is laminated on the surface of the touch sensing electrodes. As described in paragraph [0043] of PTL 3, copper is not considered as a metallic material for forming the touch sensing electrodes.

An aspect of the present invention is to provide a black electrode substrate provided with a pixel opening portion having high opening ratio, having improved visibility and high adhesiveness to a transparent substrate, and achieving good electrical connection. Another aspect of the present invention is to provide a method of manufacturing the black electrode substrate and a display device provided with the black electrode substrate.

A black electrode substrate of a first aspect according to the present invention includes a transparent substrate provided with a first surface serving as a touch-sensing input surface, a second surface disposed on an opposite side to the first surface, a display region defined on the second surface, having a rectangular shape in plan view, and an outer region defined on the second surface and located at an outer side of the display region; a first black layer disposed in the display region and the outer region of the second surface, and containing carbon as a major color material; a first indium-containing layer disposed on the first black layer, and containing indium; a copper-containing layer disposed on the first indium-containing layer, and containing copper; a second indium-containing layer disposed on the copper-containing layer, and containing indium; a second black layer disposed on the second indium-containing layer, and containing carbon as a major color material; a black electrode pattern defined by a black wiring, forming a plurality of pixel opening portions in the display region and having a terminal portion, the black wiring having a laminated structure composed of the first black layer, the first indium-containing layer, the copper-containing layer, the second indium-containing layer and the second black layer, the terminal portion being formed such that the second indium-containing layer in the laminated structure of the black wiring disposed in the outer region is exposed therefrom; and a transparent resin layer formed on the display region to overlap the black electrode pattern, and having a rectangular shape of which the size is the same as the display region in plan view.

The copper-containing layer is a metal layer such as a copper layer or a copper alloy layer. An indium-containing layer is provided on a boundary surface between a copper-containing layer and a transparent substrate, or on a boundary surface between a copper-containing layer and an organic resin layer such as a black layer, whereby a practical black wiring can be provided.

In the black electrode substrate of the first aspect according to the present invention, a line width of the first black layer, a line width of the first indium-containing layer, a line width of the copper-containing layer, a line width of the second indium-containing layer, and a line width of the second black layer are preferably the same, in the laminated structure of the black wiring.

In the black electrode substrate of the first aspect according to the present invention, each of the first indium-containing layer and the second indium-containing layer is preferably an alloy layer containing copper and indium.

In the black electrode substrate of the first aspect according to the present invention, each of the first indium-containing layer and the second indium-containing layer is preferably a metal oxide layer containing indium oxide as a major material.

In the black electrode substrate of the first aspect according to the present invention, each of the first indium-containing layer and the second indium-containing layer is preferably a metal oxide layer constituting a mixed oxide containing indium oxide and tin oxide.

In the black electrode substrate of the first aspect according to the present invention, at least a red layer, a green layer and a blue layer are preferably arranged in each of the plurality of pixel opening portions, the transparent resin layer being formed to cover the red layer, the green layer and the blue layer.

A manufacturing method of forming a black electrode substrate of a second aspect according to the present invention includes steps of preparing a transparent substrate provided with a first surface serving as a touch-sensing input surface, a second surface disposed on an opposite side of the first surface, a display region defined on the second surface, having a rectangular shape in plan view, and an outer region defined on the second surface and located at an outer side of the display region; forming a first black overall film containing carbon as a major color material on the transparent substrate; forming a first indium-containing overall film containing indium on the first black overall film; forming a copper-containing overall film containing copper on the first indium-containing overall film; forming a second indium-containing overall film containing indium on the copper-containing overall film; forming a second black overall film containing carbon as a major color material on the second indium-containing overall film; forming a second black layer by patterning the second black overall film; forming, by using the second black layer as a mask, a black electrode pattern defined by a black wiring having a laminated structure composed of the first black layer, the first indium-containing layer, the copper-containing layer, the second indium-containing layer and the second black layer, by etching the first black overall film, the first indium-containing overall film, the copper-containing overall film, and the second indium-containing overall film; forming a transparent resin layer on the display region to expose the outer region, the transparent resin layer having a rectangular shape of which the size is the same as the display region in plan view; and forming, on the outer region, a terminal portion where the second indium-containing layer is exposed, by removing a part of the transparent resin layer in a thickness direction and the second black layer located in the outer region, by dry etching using fluorocarbon-based gas.

A display device of a third aspect according to the present invention is provided with the above-described black electrode substrate of the first aspect.

A display device of a fourth embodiment according to the present invention includes the black electrode substrate according to the first aspect; a transparent conductive wiring laminated on the transparent resin layer of the black electrode substrate and formed to orthogonally cross the black wiring in plan view; an array substrate provided with an active element disposed at a location adjacent to corresponding one of the plurality of pixel opening portions in plan view, and a metal wiring electrically connected to the active element; a liquid crystal layer provided between the transparent conductive wiring and the array substrate; and a control unit having a touch sensing function detecting a change in an electrostatic capacitance produced between the black wiring and the transparent conductive wiring.

A display device of a fifth aspect of the present invention includes the black electrode substrate according to the first aspect; an array substrate provided with an active element disposed at a location adjacent to a corresponding one of the plurality of pixel opening portions in plan view, a metal wiring electrically connected to the active element, and a touch sensing wiring used for touch sensing; a liquid crystal layer provided between the black electrode substrate and the array substrate; and a control unit having a touch sensing function detecting a change in an electrostatic capacitance produced between the black wiring and the touch sensing wiring.

A display device of a sixth aspect of the present invention includes the black electrode substrate according to the first aspect; an array substrate provided with an active element disposed at a location adjacent to a corresponding one of the plurality of pixel opening portions in plan view, a metal wiring electrically connected to the active element and a common electrode forming an electrostatic capacitance with respect to the black wiring; a liquid crystal layer provided between the black electrode substrate and the array substrate; and a control unit having a touch sensing function detecting a change in an electrostatic capacitance produced between the black wiring and the common electrode.

A display device of a seventh aspect of the present invention includes the black electrode substrate according to the first aspect; an array substrate provided with an active element disposed at a location adjacent to a corresponding one of the plurality of pixel opening portions in plan view, a gate line electrically connected to the active element, a touch sensing wiring used for touch sensing, and electrically isolated from the gate line and extending in parallel to the gate line, and a light shielding layer covering the active element and formed of the same metal layer as the touch sensing wiring; a liquid crystal layer provided between the black electrode substrate and the array substrate; and a control unit having a touch sensing function detecting a change in an electrostatic capacitance produced between the black wiring and the touch sensing wiring.

The display device of the aspects according to the present invention can be adapted to liquid crystal display devices, and display devices such as an organic EL display device.

According to the aspect of the present invention, as a touch sensing technique by detecting whether or not a touch of a finger or a pointer or the like exists, for example, a touch sensing technique is known in which a change in an electrostatic capacitance is detected between a black wiring arranged on the black electrode substrate and a transparent conductive wiring arranged facing the black wiring via an insulator such as transparent resin layer. As another touch sensing technique, it has been known that a change in an electrostatic capacitance is detected between a black wiring arranged on the black electrode substrate and a metal wiring included in an array substrate disposed facing the black electrode substrate. In the electrostatic capacitive type touch sensing, the black wiring can be used as a drive electrode or a detection electrode. In the following description, the drive electrode and the detection electrode are referred to as a touch sensing electrode. A minimum configuration in which the black wiring is provided on the transparent substrate is sometimes referred to as a black electrode substrate.

According to the third to seventh aspects of the display device of the present invention, at least a red layer, a green layer and a blue layer are preferably arranged in each of the plurality of pixel opening portions, and the transparent resin layer is preferably formed so as to cover the red layer, the green layer and the blue layer.

According to the third to seventh aspects of the display device of the present invention, the metal wiring preferably has a laminated structure in which a copper-containing layer and two indium-containing layers are laminated, the copper-containing layer containing at least copper and being sandwiched between the two indium-containing layers each containing indium.

According to the third to seventh aspects of the display device of the present invention, the touch sensing wiring preferably has a laminated structure in which a copper-containing layer and two indium-containing layers are laminated, the copper-containing layer containing at least copper and being sandwiched between the two indium-containing layers each containing indium.

According to the third to seventh aspects of the display device of the present invention, the active element is preferably a transistor provided with a channel layer containing two or more metal oxides selected from a group consisting of gallium, indium, zinc, tin and germanium.

According to the aspects of the present invention, without using components having thickness like a touch panel, a black electrode substrate can be provided, including a black wiring having low resistance serving as one electrode of the touch sensing electrode. Further, since a structure using a first indium-containing layer and a second indium-containing layer is employed, a black electrode substrate can be provided, in which an adherence property between the black layer and the copper-containing layer is high, and electrical connection can readily be accomplished between a terminal electrically connected to the copper-containing layer or an electrode and the copper-containing layer. Besides, a black electrode substrate having laminated colored layers can be provided in which a red layer, a green layer, a blue layer or the like are laminated. Moreover, a display device provided with a black electrode substrate having the above-mentioned effects can be provided.

REFERENCE SIGNS LIST

1: first black layer
2: first indium-containing layer
3: copper-containing layer
4: second indium-containing layer
5: second black layer
6: black wiring
60: black wiring
7: transparent conductive wiring
8: pixel opening portion
9: transparent resin layer
11, 13: terminal portion
15, 25: transparent substrate
15a: first surface
15b: second surface
15c: display region
15d: outer region
41, 475: source line
20, 620, 720: liquid crystal layer
42, 471: gate line (scanning line)
439, 472: touch sensing wiring (touch sensing electrode)
473: light shielding layer
28, 478: gate electrode
26: active element
24, 324, 424, 474: pixel electrode
27: contact hole
29: first metal wiring
31: conductive portion
32: seal portion
33, 34, 25: insulation layer
40: second metal wiring
R: red layer
G: green layer
B: blue layer
M: end portion of metal wiring
Me: terminal portion where second indium-containing layer is exposed
S: slit
100: black electrode substrate
200, 300, 400, 450: array substrate
500, 600, 700, 800: display device (liquid crystal display device)

Obviously, numerous modifications and variations of the present invention are possible in light of the above teachings. It is therefore to be understood that within the scope of the appended claims, the invention may be practiced otherwise than as specifically described herein.

What is claimed is:

1. A black electrode substrate, comprising:
   a transparent substrate having a first surface which is a touch-sensing input surface and a second surface opposite to the first surface, the second surface having a display region in a rectangular shape in plan view and an outer region outside of the display region;
   a black wiring forming a black electrode pattern that defines a plurality of pixel opening portions in the display region; and
   a transparent resin layer formed in the display region such that the transparent resin layer overlaps with the black electrode pattern and has the same rectangular shape as the display region in plan view,
   wherein the black wiring has a laminated structure including
      a first black layer including carbon and positioned in the display region and the outer region,
      a first indium-containing layer positioned on the first black layer,
      a copper-containing layer positioned on the first indium-containing layer,
      a second indium-containing layer positioned on the copper-containing layer, and
      a second black layer positioned on the second indium-containing layer, and
   the black wiring has a terminal portion formed such that the second indium-containing layer positioned in the outer region is exposed from the laminated structure.

2. The black electrode substrate of claim 1, wherein the first black layer, the first indium-containing layer, the copper-containing layer, the second indium-containing layer, and the second black layer have a same line width in the laminated structure.

3. The black electrode substrate of claim 1, wherein the first indium-containing layer and the second indium-containing layer each comprise an alloy including copper and indium.

4. The black electrode substrate of claim 1, wherein the first indium-containing layer and the second indium-containing layer each comprise indium oxide.

5. The black electrode substrate of claim 1, wherein the first indium-containing layer and the second indium-containing layer each comprise a mixed oxide including indium oxide and tin oxide.

6. The black electrode substrate of claim 1, wherein at least a red layer, a green layer and a blue layer are positioned in each of the pixel opening portions, and the transparent resin layer covers the red layer, the green layer and the blue layer.

7. A method of manufacturing a black electrode substrate, comprising:
   preparing a transparent substrate having a first surface which is a touch-sensing input surface and a second surface opposite to the first surface such that the second surface has a display region in a rectangular shape in plan view and an outer region outside of the display region;

forming a black wiring having a black electrode pattern;

forming a transparent resin layer in the display region such that the transparent resin layer has the same rectangular shape as the display region in plan view, and that the outer region is exposed; and forming a terminal portion of the black wiring on the outer region, wherein the forming of the black wiring includes
forming a first black film including carbon on the transparent substrate,
forming a first indium-containing film on the first black film,
forming a copper-containing film on the first indium-containing film,
forming a second indium-containing film on the copper-containing film,
forming a second black film including carbon on the second indium-containing film,
forming a second black layer by patterning the second black film, and
etching, with the second black layer as a mask, the first black film, the first indium-containing film, the copper-containing film, and the second indium-containing film such that the black electrode pattern is formed, and the forming of the terminal portion includes removing a portion of the transparent resin layer in a thickness direction and the second black layer located in the outer region.

8. The method of claim 7, wherein the removing is executed by dry etching with fluorocarbon-based gas.

9. A display device, comprising:
the black electrode substrate of claim 1.

10. A display device, comprising:
the black electrode substrate of claim 1;
a transparent conductive wiring positioned on the transparent resin layer of the black electrode substrate and formed in orthogonal to the black wiring in plan view;
an array substrate including an active element positioned adjacent to each of the pixel opening portions in plan view, and a metal wiring electrically connected to the active element;
a liquid crystal layer positioned between the transparent conductive wiring and the array substrate; and
a control unit having a touch sensing function that detects a change in an electrostatic capacitance between the black wiring and the transparent conductive wiring.

11. A display device, comprising:
the black electrode substrate of claim 1;
an array substrate including an active element positioned adjacent to each of the pixel opening portions in plan view, a metal wiring electrically connected to the active element, and a touch sensing wiring;
a liquid crystal layer positioned between the transparent conductive wiring and the array substrate; and
a control unit having a touch sensing function that detects a change in an electrostatic capacitance between the black wiring and the touch sensing wiring.

12. A display device, comprising:
the black electrode substrate of claim 1;
an array substrate including an active element positioned adjacent to each of the pixel opening portions in plan view, a metal wiring electrically connected to the active element, and a common electrode providing an electrostatic capacitance with respect to the black wiring;
a liquid crystal layer positioned between the transparent conductive wiring and the array substrate; and
a control unit having a touch sensing function that detects a change in the electrostatic capacitance between the black wiring and the common electrode.

13. A display device, comprising:
the black electrode substrate of claim 1;
an array including an active element positioned adjacent to each of the pixel opening portions in plan view, a gate line electrically connected to the active element, a touch sensing wiring electrically isolated from the gate line and extending in parallel to the gate line, and a light shielding layer covering the active element and comprising a metal same as the touch sensing wiring;
a liquid crystal layer positioned between the transparent conductive wiring and the array substrate; and
a control unit having a touch sensing function that detects a change in an electrostatic capacitance between the black wiring and the touch sensing wiring.

14. The display device of claim 9, wherein at least a red layer, a green layer or a blue layer are positioned in each of the pixel opening portions, and the transparent resin layer covers the red layer, the green layer and the blue layer.

15. The display device of claim 10, wherein the metal wiring has a laminated structure including two indium-containing layers and a copper-containing layer positioned between the two indium-containing layers each including indium.

16. The display device of claim 11, wherein the metal wiring has a laminated structure including two indium-containing layers and a copper-containing layer positioned between the two indium-containing layers each including indium.

17. The display device of claim 12, wherein the metal wiring has a laminated structure including two indium-containing layers and a copper-containing layer positioned between the two indium-containing layers each including indium.

18. The display device of claim 11, wherein the touch sensing wiring has a laminated structure including two indium-containing layers and a copper-containing layer positioned between the two indium-containing layers each containing indium.

19. The display device of claim 13, wherein the touch sensing wiring has a laminated structure including two indium-containing layers and a copper-containing layer positioned between the two indium-containing layers each containing indium.

20. The display device of claim 11, wherein the active element is a transistor having a channel layer including a plurality of metal oxides in which a metal is at least one selected from the group consisting of gallium, indium, zinc, tin and germanium.

* * * * *